United States Patent [19]

Tomita et al.

[11] Patent Number: 5,054,866
[45] Date of Patent: Oct. 8, 1991

[54] SCANNING OPTICAL APPARATUS

[75] Inventors: Kan Tomita, Kawasaki; Tomohiro Oikawa, Yokohama, both of Japan

[73] Assignee: Ricoh Company, Ltd., Tokyo, Japan

[21] Appl. No.: 458,183

[22] Filed: Dec. 27, 1989

[30] Foreign Application Priority Data

| Dec. 29, 1988 | [JP] | Japan | 63-332470 |
| Jan. 5, 1989 | [JP] | Japan | 64-789 |
| Jan. 20, 1989 | [JP] | Japan | 1-11034 |
| Jan. 30, 1989 | [JP] | Japan | 1-20528 |
| Feb. 1, 1989 | [JP] | Japan | 1-23175 |
| Feb. 6, 1989 | [JP] | Japan | 1-27132 |
| Oct. 31, 1989 | [JP] | Japan | 1-283911 |

[51] Int. Cl.$^5$ .......................................... G02B 26/10
[52] U.S. Cl. .................... 359/201; 250/236; 359/210; 359/206; 359/218
[58] Field of Search ............... 350/6.7, 6.8, 6.2, 6.3, 350/452; 250/235, 236, 548, 6.4; 356/400; 346/108

[56] References Cited

U.S. PATENT DOCUMENTS

| 4,314,154 | 2/1982 | Minoura et al. | 350/6.7 |
| 4,321,700 | 3/1982 | Russell | 350/6.7 |
| 4,847,492 | 7/1989 | Houki | 350/6.8 |

FOREIGN PATENT DOCUMENTS

| 65920 | 5/1980 | Japan | 350/6.3 |
| 57-14820 | 1/1982 | Japan . | |
| 58-57108 | 4/1983 | Japan . | |
| 59-62821 | 4/1984 | Japan . | |
| 63-106618 | 5/1988 | Japan . | |

Primary Examiner—Loha Ben
Attorney, Agent, or Firm—Oblon, Spivak, McClelland, Maier & Neustadt

[57] ABSTRACT

A scanning optical apparatus includes an image forming unit disposed between a medium to be scanned and a diflective reflection surface of a rotary polygon mirror so as to make a light beam deflected by the rotary polygon mirror form an image on the medium to be scanned and as to maintain the deflective reflection surface and the medium to be scanned in a geometrically optical conjugate relationship in a plane perpendicular to a surface to be deflectively scanned with the deflected light beam, and a vibration unit for vibrating another image forming optical unit in a direction of an optical axis of light beam emitted from a light source in synchronization with a deflection scanning of the rotary polygon mirror so as to vibrate an image forming position, at which the aforementioned another image forming optical unit forms a linear image, along the optical axis of the emitted light.

31 Claims, 21 Drawing Sheets

Fig. 3
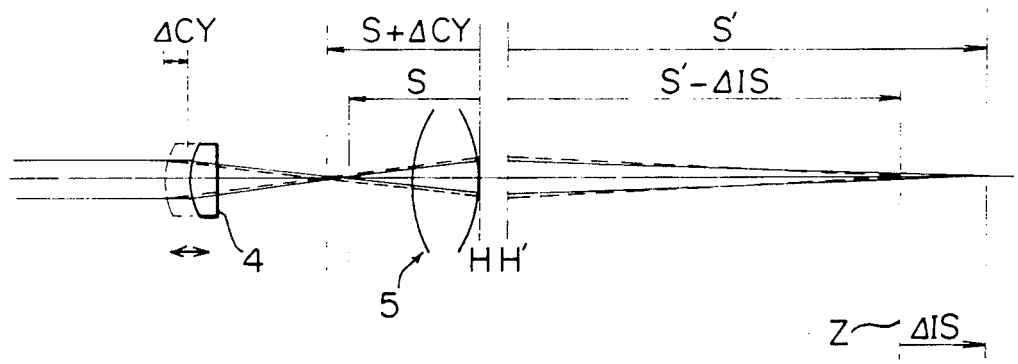
Fig. 4a
Fig. 4b
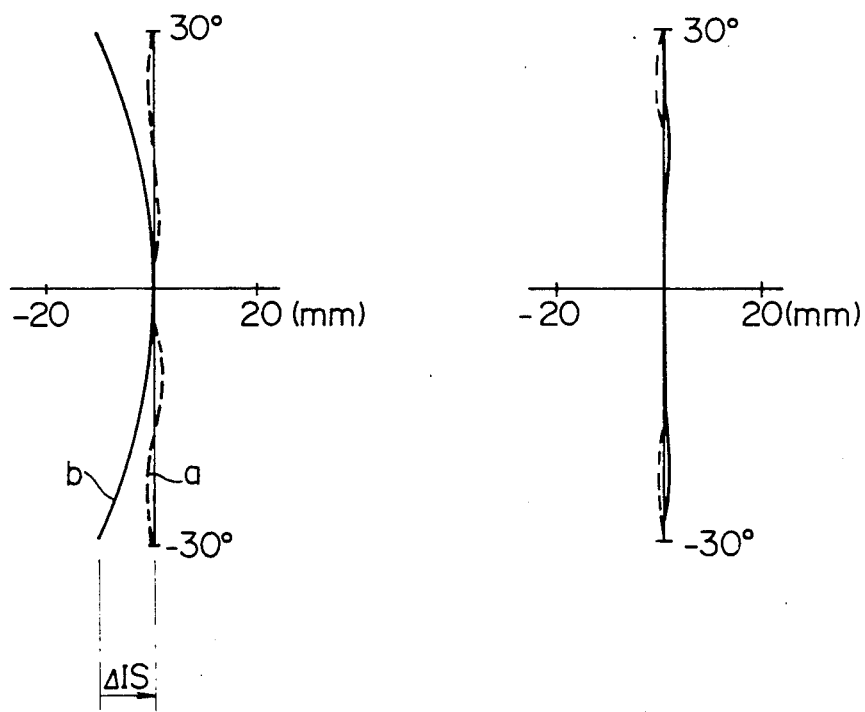

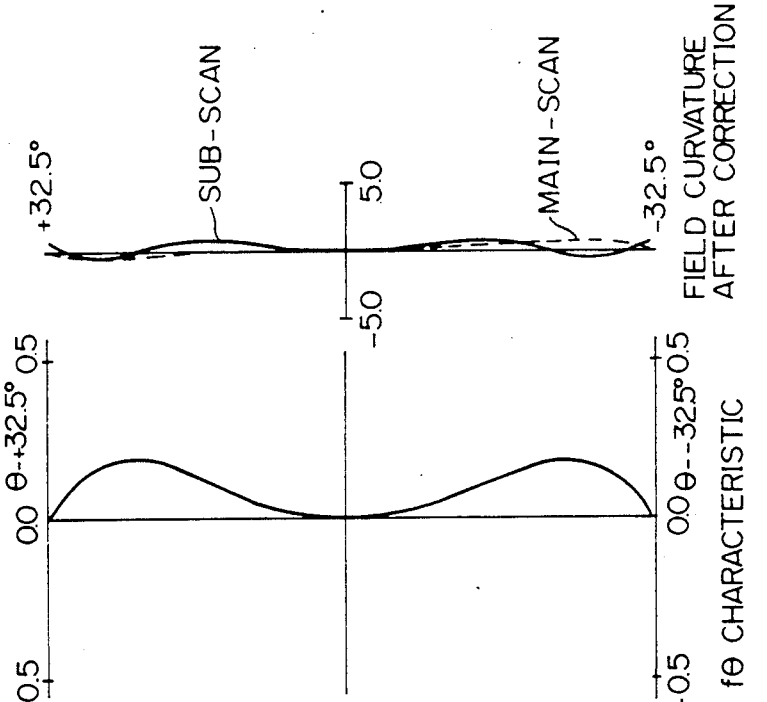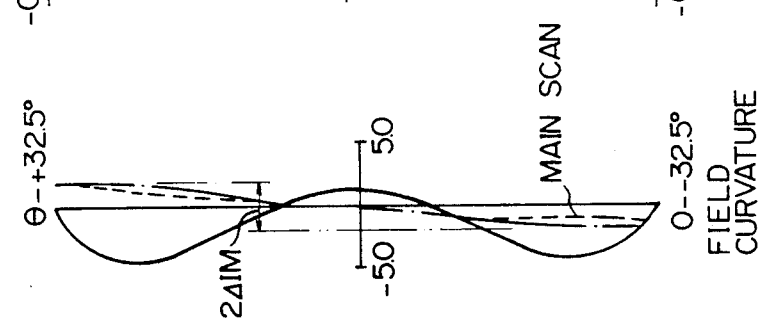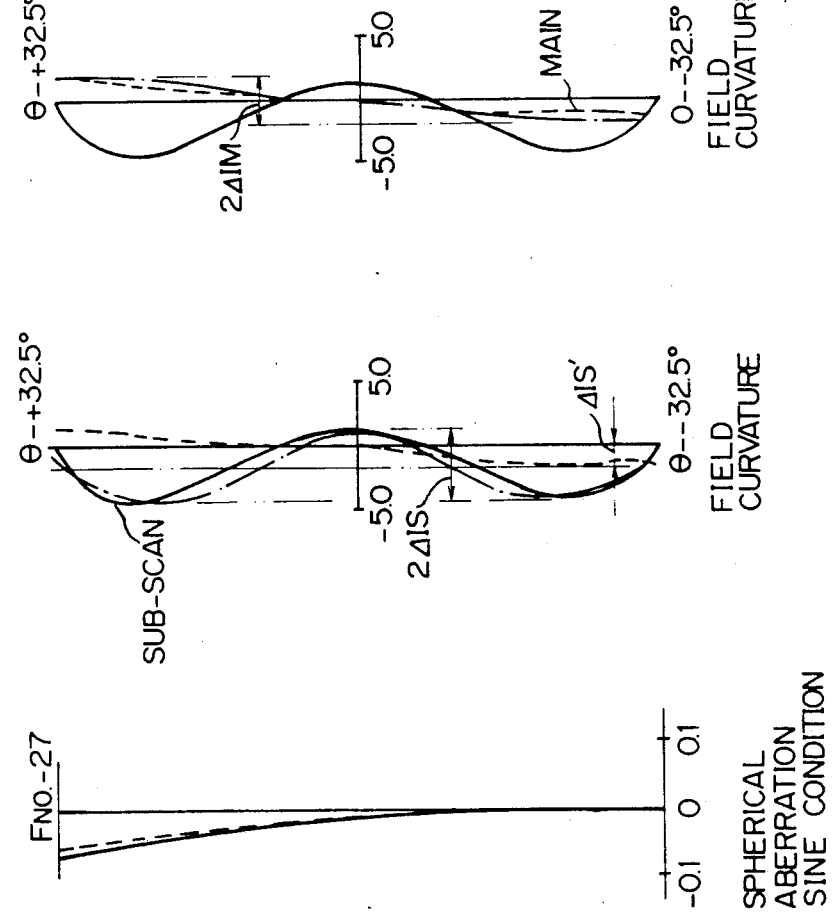

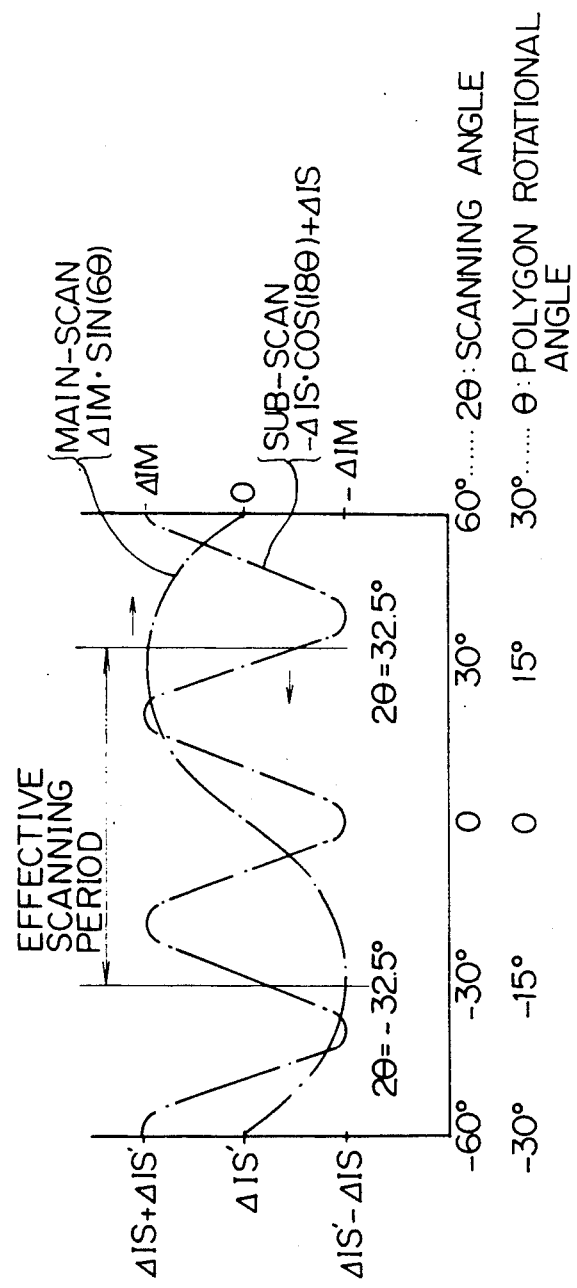

QUANTITY OF MOVEMENT OF
FIRST CYLINDRICAL LENS

SCANNING OPTICAL APPARATUS

BACKGROUND OF THE INVENTION

1. Field of the Invention

The present invention relates to a scanning optical apparatus for use in digital copying machines, laser printers, laser plotters, laser facsimiles, laser photoengravers, and, more particularly, to a scanning optical apparatus having a plane-inclination correction function and capable of reducing the curvature of the field.

2. Description of the Related Art

There have been known a scanning optical apparatus capable of scanning a medium to be deflectively scanned by a variety of deflectors with light from a light source. The scanning optical apparatuses of the type described above have been used as the scanning optical systems of digital copying machines, laser printers, laser plotters, laser facsimiles, laser photoengravers, and the like.

In the conventional scanning optical apparatus described above, a fact is known that the pitch of the main scanning lines is caused to be nonuniform due to the inclination of the plane of a reflection surface at the time of the deflection if the reflection surface is used for deflecting a light beam. Therefore, it is necessary for the plane inclination to be corrected.

If the deflection angle in the scanning optical apparatus is arranged to be a large degree at the time of the deflection scanning, the curvature of field takes place by the image-forming lens system. Therefore, the field curvature taking place due to the image-forming lens system must be corrected in both the main and sub-scanning directions.

On the one hand, the scanning optical apparatuses have been usually arranged to use a rotary polygon mirror in the optical deflector thereof since a high speed scanning operation is required recently. In the case where the rotary polygon mirror is used as the optical deflector, the above-described plane inclination takes place in each of the reflection surfaces, causing the scanning positions on the surface to be scanned to become nonuniform.

Therefore, scanning optical apparatuses each of which is provided with a correction optical system capable of preventing the plane inclination taking place in the case where the rotary polygon mirror is used as the deflector has been disclosed in Japanese Patent Laying Open (KOKAI) No. 63-106618, and Japanese Patent Laying Open (KOKAI) No. 62-147421.

On the other hand, in order to correct the field curvature taking place in the scanning optical apparatus, there has been a technology relating to a post-objective type scanning optical apparatus which is, for example, adapted in such a manner that an image forming lens system (which comprises a spherical lens) is disposed in front of the deflector. Another technology disclosed relates to a post and pre-objective hybrid type scanning optical apparatus adapted in such a manner that the image forming lens system (which comprises a spherical lens) is disposed in front of or behind the deflector. A technology relating to the former type of the scanning optical apparatus has been disclosed in Japanese Patent Laying Open (KOKAI) No. 57-14820 in which the field curvatures in both the main and the sub-scanning directions are corrected by moving the light source in the direction of the optical axis in synchronization with the deflective scanning operation. A technology relating to the latter type of the scanning optical apparatus has been disclosed in Japanese Patent Laying Open (KOKAI) No. 58-57108 in which the field curvature is similarly corrected in both the main and the sub-scanning directions by moving the collimator lens and the converging lens in the direction of the optical axis in synchronization with the deflective scanning operation.

As an alternative to the above-described structures in which the light source or the lens is moved, it might be considered feasible to employ a construction adapted in such a manner that the field curvature is corrected by using an optical element having a variable focal length. The optical elements capable of varying their focal length for the purpose of conducting the correction of the field curvature have been disclosed in, for example, Japanese Patent Laying Open (KOKAI) No. 52-32348, Japanese Patent Laying Open (KOKAI) No. 54-99654, Japanese Patent Laying Open (KOKAI) No. 62-119520, Japanese Patent Laying Open (KOKAI) No. 62-129814, Japanese Patent Laying Open (KOKAI) No. 62-129816, Japanese Patent Laying Open (KOKAI) No. 62-151824, Japanese Patent Laying Open (KOKAI) No. 62-153933, Japanese Patent Laying Open (KOKAI) No. 62-157008, Japanese Patent Laying Open (KOKAI) No. 59-62821.

In the case where the image forming lens system of the scanning optical system having the above-described function capable of correcting the above-described field curvature is a spherical lens, the plane inclination cannot be easily corrected.

In the scanning optical system having the above-described function capable of correcting the plane inclination, lenses each having a different power (refracting power) are disposed in its optical path in both the main scanning and sub-scanning directions. Therefore, an astigmatic difference is involved, causing the field curvatures to usually become different between the main scanning direction and the sub-scanning direction.

Therefore, a problem arises in that the field curvature cannot be sufficiently corrected in both the main scanning and sub-scanning directions if the above-described mechanism for correcting the field curvature is applied to the correction scanning optical system which involves the plane inclination, the spherical lens disposed in the optical path or the light source being moved as described above in the application above. In the above-described disclosures, the operations such as sine wave vibrations conducted at the time of the correction of the field curvature have been described, but no specific descriptions have been made about the control of the movements of the light source or the lens or the control of the variation of the focal length of the optical element which is necessary to be conducted when the field curvature is corrected by the conventional method.

In the scanning optical system having the rotary polygon mirror therein, a synchronization control ranged from several hundred to several thousand Hz must be conducted. Therefore, a problem arises in that the movement of the lens or the light source cannot follow the deflective scanning operation due to a delay in the control in the case of the control of a usual opened loop. As a result, a satisfactory effect of correcting the field curvature cannot be obtained.

In a usual optical system capable of correcting the plane inclination in which no mechanism capable of mechanically correcting the field curvature is provided, an fθ lens or the like is employed in its optical system for the purpose of correcting the field curvature by the effect obtainable from the lens structure. Therefore, the field curvatures in both the main scanning and the sub-scanning directions, the fθ characteristic (magnifying power error, uniform scanning feasibility), spherical aberration, sine conditions must be taken into consideration as the factors at the design of the optical system. However, the above-described factors are in the trade-off relationship. Therefore, it is difficult to simultaneously and satisfactorily satisfy all of the design factors above.

Recently, since the scanning optical systems have been arranged to be high density systems, therefore, the field curvature must be further precisely corrected in the scanning optical apparatuses having the optical systems capable of correcting the plane scanning. As a result, the required level of the precision in the fθ lens and the like has been raised and the number of the lenses has been increased. Therefore, the assembling and the adjustment of the components are difficult to be conducted. In addition, the overall cost of the scanning optical apparatus becomes excessive due to increase in the number of the components.

SUMMARY OF THE INVENTION

An object of the present invention is to provide an excellent performance scanning optical apparatus in which a novel filed curvature correction method is employed and whose component such as fθ lens, the collimator lens, the cylindrical lens, and the like can be readily designed. In particular, it is an object of the present invention to provide a cheap scanning optical apparatus capable of correcting the field curvature without the necessity of employing a complex and expensive lens system consisting of a multiplicity of lenses.

The above-described object can be achieved by a scanning optical apparatus comprising: a light source for emitting a light beam; collimator optical unit for substantially parallelizing the emitted light beam; first image-forming optical unit for making the parallelized light beam form a linear image; a rotary polygon mirror having deflective reflection surfaces for deflecting and scanning said formed light beam; second image forming optical unit disposed between a medium to be scanned and the deflective reflection surfaces for making the deflected light beam form an image on the medium to be scanned and for maintaining the deflective reflection surfaces and the medium to be scanned in a geometrically optical conjugate relationship in a plane perpendicular to a deflective scanning plane of the deflected light beam; and vibration unit for vibrating the first image forming optical unit in a direction of an optical axis of the emitted light beam in synchronization with a deflective scanning of the rotary polygon mirror so as to vibrate in the direction an image-forming position at which the parallelized light beam is made to form a linear image by the first image forming optical unit.

The scanning optical apparatus of the present invention further comprises a detection unit for detecting a quantity of amplitude of the first image forming optical means, and control unit for controlling the vibration means so as to vibrate the first image forming optical unit with a predetermined amplitude and period in accordance with a quantity of amplitude detected by the detection unit.

The scanning optical apparatus of the present invention further comprises a beam splitter disposed between the first image forming optical unit and the image forming position realized by the first image forming optical unit for splitting a portion of the light beam emitted from the first image forming optical unit in a direction crossing the light beam, and image forming state detection unit disposed on an optical path of the splitted light beam so as to detect a state of forming an image of the splitted light beam.

According to the scanning apparatus according to the present invention, the second image forming optical means make the deflected light beam form an image on the medium to be scanned and is disposed between the medium to be scanned and the deflective reflection surface in order to maintain a geometrically optical conjugate relationship between the deflective reflection surface and the medium to be scanned on a plane perpendicular to a deflective scanning plane of the deflected light beam. Therefore, the scanning optical apparatus according to the present invention, can correct nonuniform pitches of the main scanning lines due to the inclination of the deflective reflection surface.

Furthermore, according to the scanning optical apparatus according to the present invention, there is provided the vibration unit capable of vibrating the first image forming optical unit in the direction of the optical axis of the emitted light beam in synchronization with the deflective scanning operation of the rotary polygon mirror for the purpose of vibrating the image forming position at which the parallelized light beam is made to form an image by the first image forming optical unit in the direction of the optical axis of the light beam emitted from the light source. Therefore, the scanning optical apparatus according to the present invention can correct the field curvature due to a lens system of the first image forming optical unit.

According to the present invention, the scanning optical system can be readily designed so that high density writing and scanning can be conducted, and high performance scanning optical apparatus can be provided. Furthermore, according to the present invention, since the field curvature in the main scanning and the sub-scanning directions can be corrected without the necessity of using a complicated lens system in which a large number of lenses are provided in the optical system of the scanning optical apparatus, a scanning optical apparatus whose cost can be reduced can be provided.

According to the scanning optical apparatus according to a further embodiment of the present invention, there is provided a detection unit for detecting the quantity of the amplitude of the first image forming optical unit and a control unit for controlling the vibration unit so as to vibrate the first image forming optical unit with a predetermined amplitude and period in accordance with the quantity of amplitude detected by the detection means. Therefore, in the scanning optical apparatus according to the present invention, the vibration of the first image forming optical unit can be harmonized with the deflective scanning operation conducted by the rotary polygon mirror so that the correction of the field curvature can be accurately and effectively conducted.

According to the scanning optical apparatus according to a further embodiment of the present invention, there is provided a beam splitter disposed between the first image forming optical unit and the image forming position realized by the first image forming optical unit for splitting a portion of the light beam emitted from the first image forming optical means in the direction crossing the light beam, and image forming state detection unit disposed on the optical path of the splitted light beam so as to detect the state of forming an image of the splitted light beam. Therefore, the scanning optical apparatus according to the present invention, the close loop control can be conducted so as to vibrate the first image forming optical unit to follow the deflective scanning operation of the rotary polygon mirror. As a result, the accuracy in correcting the field curvature can be improved.

BRIEF DESCRIPTION OF THE DRAWINGS

FIG. 2A is a schematic view which illustrates the arrangement of the optical system on the deflective scanning plane, and FIG. 2B is a schematic view which illustrates the arrangement of the optical system on a plane perpendicular to the deflective scanning plane and including the optical axis;

FIG. 3 illustrates a method of correcting the field curvature of the optical system shown in FIG. 2;

FIGS. 4A and 4B illustrate the aberrations, where FIG. 4A illustrates the aberration before correction of the field curvature by the optical system shown in FIG. 2 and FIG. 4B illustrates the aberration after correction of the field curvature by the optical system shown in FIG. 2;

FIG. 6A is a schematic view which illustrates the arrangement of the optical system on the deflective scanning plane, and FIG. 6B is a schematic view which illustrates the arrangement of the optical system on the plane perpendicular to the deflective scanning plane and including the optical axis;

FIGS. 7A, 7B, 7C, 7D, and 7E illustrate aberrations before the correction of the field curvature by the optical system shown in FIGS. 6A and 6B and aberrations after the correction in both the main scanning and the sub-scanning directions, where FIGS. 7A, 7B, and 7C illustrate the aberrations before the correction, FIG. 7D illustrates the $f\theta$ characteristic, and FIG. 7E illustrates an aberration after the correction;

FIG. 8 is a graph which illustrates the relationship between the quantities of the field curvature in the main scanning and sub-scanning directions and the scanning angles at the time when the field curvature is corrected by the optical systems shown in FIGS. 6A and 6B;

FIG. 9A is a schematic view which illustrates the arrangement of the optical system on the deflective scanning plane, and FIG. 9B is a schematic view which illustrates the arrangement of the optical system on the plane perpendicular to the deflective scanning plane and including the optical axis;

FIG. 11A is a schematic view which illustrates the arrangement of the optical system on the deflective scanning plane, and FIG. 11B is a schematic view which illustrates the arrangement of the optical system on the plane perpendicular to the deflective scanning plane and including the optical axis;

FIG. 12A is a side elevational view which illustrates the Fresnel lens when viewed from the sub-scanning direction, FIG. 12B is a plan view which illustrates the Fresnel lens when viewed from the direction of the optical axis, and FIG. 12C is a side elevational view which illustrates the Fresnel lens when viewed from the main scanning direction;

FIG. 13A is a schematic view which illustrates the arrangement of the optical system on the deflective scanning plane, FIG. 13B is a schematic view which illustrates the arrangement of the optical system on the plane perpendicular to the deflective scanning plane and including the optical axis;

FIG. 13C is a schematic view which illustrates the arrangement of the optical system on the plane perpendicular to the deflective scanning plane and including the optical axis, FIG. 13D is a schematic view which illustrates the arrangement of the optical system on the plane perpendicular to the deflective scanning plane and including the optical axis;

FIG. 14A is a schematic view which illustrates the arrangement of the optical system on the deflective scanning plane, and FIG. 14B is a schematic view which illustrates the optical system on the plane perpendicular to the deflective scanning plane and including the optical axis;

DESCRIPTION OF THE PREFERRED EMBODIMENTS

Figure 1:
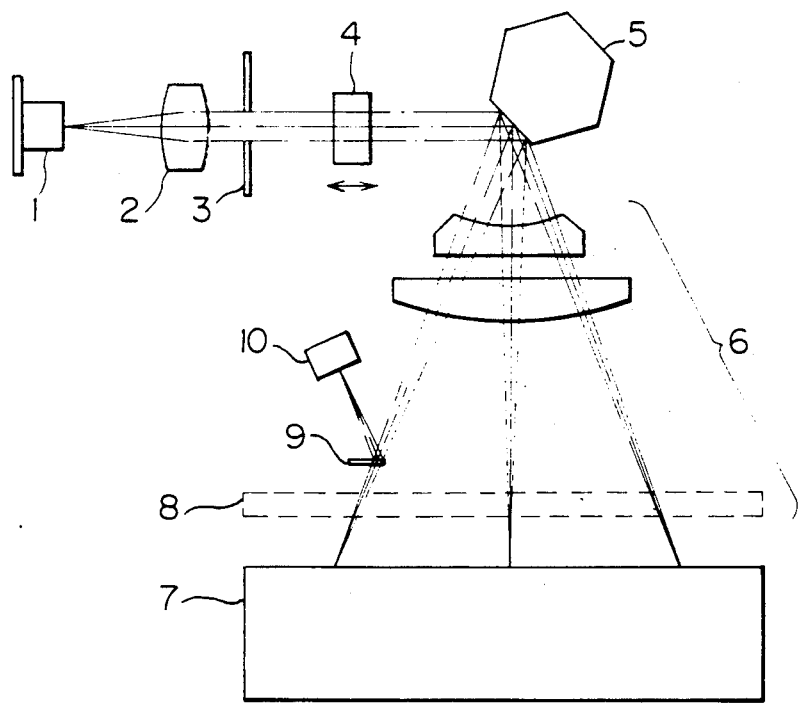
FIG. 1 is a schematic structural view which illustrates an embodiment of a scanning optical apparatus according to the present invention.

Then, embodiments of the present invention will be successively described in detail referring to the drawings.

A first embodiment of the present invention will be described with reference to FIGS. 1 to 15A and 15B.

First, the basic structure of a scanning optical apparatus will be described.

FIG. 1 is a schematic structural view which illustrates a first embodiment of the scanning optical apparatus according to the present invention. The scanning optical apparatus comprises a laser beam source 1 constituted by a semiconductor laser (LD) or the like, a collimator lens 2 for substantially parallelizing the light beam emitted from the laser beam source 1, an aperture 3 for cutting the unnecessary peripheral portion of the light beam parallelized by the collimator lens 2, a first cylindrical lens 4 for making the light beam form a linear image passed through the aperture 3, a rotary polygon mirror 5 having a deflective reflection surface with which the light beam emitted from the first cylindrical lens 4 are deflectively scanned, a photosensitive body 7 serving as a medium to be scanned by the light beam deflected by the rotary polygon mirror 5, and an $f\theta$ lens system 6 disposed between the photosensitive body 7 and the deflective reflection surface of the rotary polygon mirror 5 and making the thus deflected light beam form an image on the photosensitive body 7, the $f\theta$ lens system 6 also maintaining the deflective reflection surface and the photosensitive body 7 in a geometrically optical conjugate relationship in a plane perpendicular to a deflective scanning plane of the light beam deflected by the rotary polygon mirror 5. The lens 4 is moved in the direction of the optical axis in accordance with the scanning operation by the rotary polygon mirror 5 and the deflective reflection surface of the rotary polygon mirror 5 is disposed in the vicinity of a position where the lens 4 forms an image. The fθ lens system 6 is provided with a second cylindrical lens 8, a mirror 9 disposed at an end portion of the light beam scanned deflectively by the rotary polygon mirror 5 and capable of reflecting a portion of the light beam and a synchronization detector 10 capable of detecting the light beam reflected by the mirror 9.

Therefore, in the scanning optical apparatus structured as shown in FIG. 9, the light beam emitted from the laser beam source 1 are substantially parallelized after the light beam has passed through the collimator lens 2. Thereafter unnecessary and peripheral portion of the parallelized light beam is cut by the aperture 3. The thus treated light beam then enters the lens 4. The light beam which has passed through the lens 4 are deflectively scanned by the rotary polygon mirror 5, and then the light beam passes through the fθ lens system including the lens 8. Thereafter the thus passed light beam is made to form an image on the photosensitive body 7. The passed light beam is scanned while forming small spot on the photosensitive body 7.

The light beams at the end portion of the scanning plane are introduced into the synchronization detector 10 by the mirror 9. The writing of data is synchronized in response to a signal from the detector 10.

Furthermore, the lens 4 is moved in the direction of the optical axis in response to the signal from the detector 10 so that the field curvature of the optical system can be corrected.

The fθ lens system 6 disposed between the photosensitive body 7 and the deflective reflection surface of the rotary polygon mirror 5 makes the thus deflected light beam form an image on the photosensitive body 7. The fθ lens system 6 maintains the deflective reflection surface and the photosensitive body 7 in a geometrically optical conjugate relationship in the plane perpendicular to the deflective scanning surface of the light beams deflected by the rotary polygon mirror 5, so that the plane inclination is corrected.

Figure 2A:
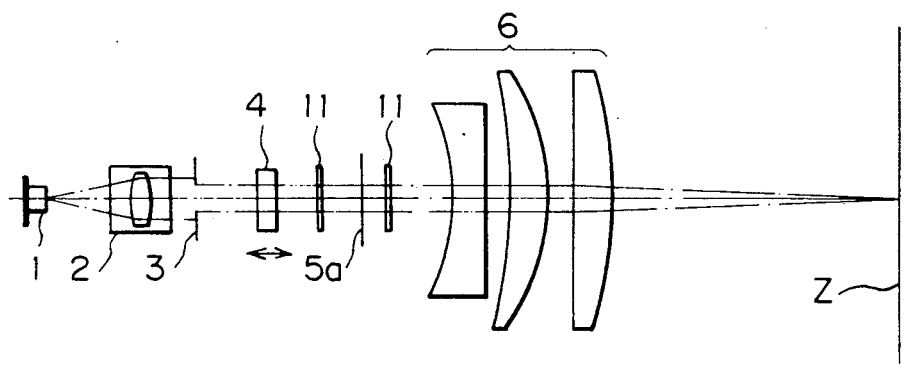
FIGS. 2A and 2B are schematic views which illustrate an optical system of the scanning optical apparatus shown in FIG. 1, where
Figure 2B:
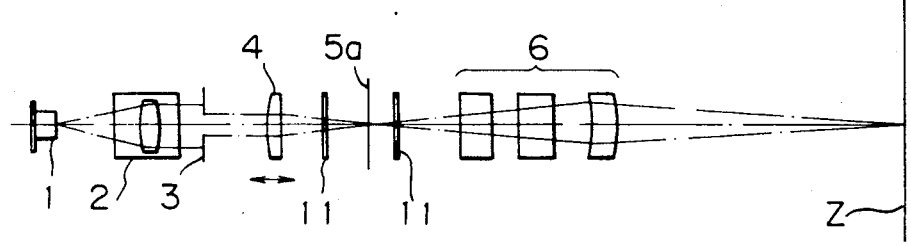

FIG. 2 is a schematic view which illustrate the optical system of the scanning optical apparatus shown in FIG. 1, where FIG. 2A is a schematic view which illustrates the optical system on the deflective scanning plane (main scan), while FIG. 2B is a schematic view which illustrates the optical system on a plane (sub-scan) perpendicular to the deflective scanning plane and including the optical axis.

As described above, the correction of the plane fall is attained by using an anamorphic optical system as the fθ lens system 6, and maintaining a deflective reflection surface 5a of the rotary polygon mirror 5 and an image surface Z in a geometrically optically conjugate relationship in the sub-scanning operation.

Referring to the drawings, reference numeral 11 represents a soundproof glass surrounding the rotary polygon mirror 5.

Then, the movement of the image forming positions, caused when the lens 4 in the optical system shown in FIG. 2 is moved in the direction of the optical axis, is shown in FIG. 3.

Referring to FIG. 3, the position of the lens 4 and the light beams before the lens 4 is moved are designated by a solid line, while the position of the lens 4 and the light beams after the lens 4 has moved are designated by a dashed line. Assuming that an amount of movement of the image-forming position is $\Delta IS$, when an amount of movement of the lens 4 is $\Delta cy$.

Provided that the distance between the image forming position of the lens 4 before the movement and a principal point of the fθ lens system 6 is S, the image forming position of the fθ lens system 6 is S', and the focal length of the fθ lens system 6 is f the following relationship holds for S.

$$S = \frac{S'f}{S' - f}$$

Furthermore, the following relationship holds similarly:

$$S + \Delta cy = \frac{(S' - \Delta IS)f}{S' - \Delta IS - f}$$

Therefore, $\Delta cy$ becomes:

$$\Delta cy = \frac{\Delta IS \cdot f^2}{(S' - \Delta IS - f)(S' - f)}$$

where assuming that $\Delta IS << S'-f$, $\Delta cy$ can be represented as follows:

$$\Delta cy = \frac{\Delta IS \cdot f^2}{(S' - f)^2} = \frac{\Delta IS}{m^2} \text{ (where } m = S'/S\text{)}$$

That is, in the case where field curvature of $\Delta IS$ takes place, this field curvature can be corrected in the sub-scanning direction by moving the lens 4 by $\Delta cy = -\Delta IS/m^2$. As for the main scanning direction, since the lens 4 has no power as shown in FIG. 2A, the field curvature does not occur.

FIGS. 4A and 4B illustrate the aberrations in the scanning optical apparatus according to the present invention, the aberrations being shown in the state before the field curvature has been corrected and in the state after the same has been corrected.

First, the field curvature uncorrected as shown in FIG. 4A will be described. The lens system is arranged so as to reduce the field curvature in Main scan a. On the other hand, any measurement is not taken to reduce the field curvature in sub-scan b. Therefore, the field curvature on the sub-scan side is caused in a circular arc shape or in a parabola shape. The amount of the curvature reaches substantially 10 mm at a position at which the half of the scanning angle is ±30° (the polygon mirror rotates by ±15°). The curve can be approximated by a portion of a sine curve or a cosine curve. Therefore, the quantity of the correction and the quantity of the field curvature can be plotted as in the graph shown in FIG. 5. Assuming that the quantity of the field curvature at ±30° shown in FIG. 4A is $\Delta IS$, it is preferable that the quantity of correction of the field curvature be:

$$\Delta IS(\theta) = \Delta IS(-\cos(6\theta) + 1)$$

where $\theta$ represents the rotational angle of the polygon mirror 5, and the image height ratio becomes 0 when $\theta = 0$.

According to the embodiment shown in FIG. 1, the rotational angle $\theta$ of one surface of the polygon mirror 5 can be put to be ±30° since the number of the planes of the rotary polygon mirror 5 is six. Therefore, the lens 4 can be moved smoothly when the next reflection surface has rotated to a predetermined position, the smooth movement being realized by periodically moving the lens 4 by n (n is an integer over 1) cycles in the course of rotating the one surface of the polygon mirror 5 by ±30°.

Figure 5:
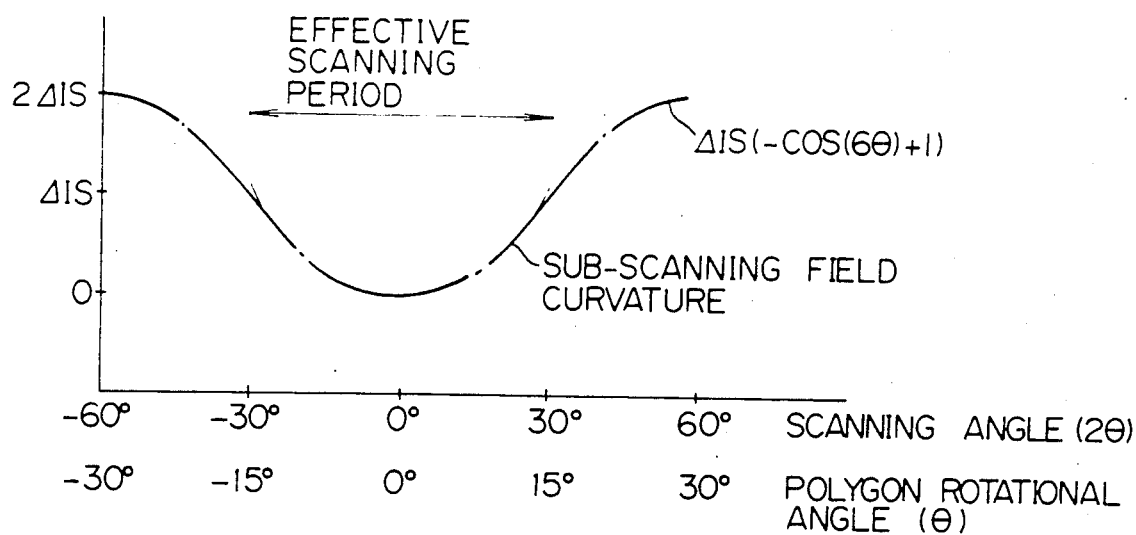
FIG. 5 is a graph which illustrates the relationships between the scanning angle and the quantity of field curvature, and between the scanning angle and the quantity of correction at the time of correcting the field curvature by the optical systems shown in FIGS. 2A and 2B.

That is, when the number of the mirrors of the rotary polygon mirror 5 is N, the first cylindrical lens 4 is caused to be moved by n cycles at ±180°/N. Therefore, the field curvature in the sub-scanning direction can be corrected as shown in FIG. 4B by moving the lens 4. At this time, the field curvature in the main scanning direction is not moved. FIG. 5 illustrates the case where n=1.

Figure 6A:
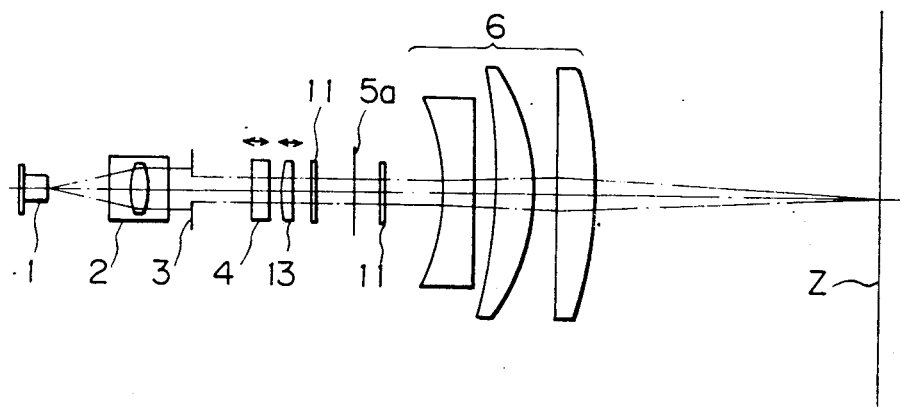
FIGS. 6A and 6B are schematic views which illustrate the optical systems of the other embodiments of the scanning optical apparatus according to the present invention; where
Figure 6B:
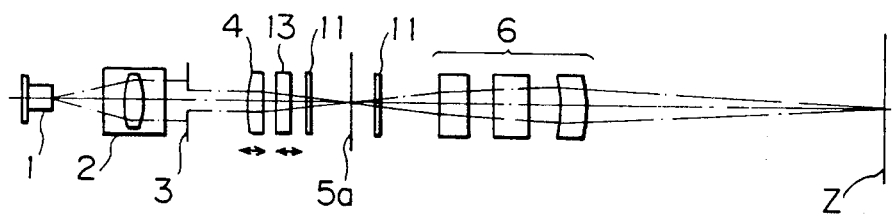

FIG. 6A illustrates a second embodiment of the present invention in which the optical system on the deflective scanning plane (main scan) is schematically illustrated, while FIG. 6B schematically illustrates the optical system on the plane (sub-scan) perpendicular to the deflective scanning plane and including the optical axis.

The scanning optical apparatus according to the embodiment shown in FIGS. 6A and 6B comprises a third cylindrical lens 13 disposed between the first collimator lens 2 and the rotary polygon mirror 5 and having a power (refracting power) in the main scanning direction. The third cylindrical lens 13 is, similarly to the first cylindrical lens 4, moved so that the field curvature in the main scanning direction is corrected.

That is, in the main scanning plane, assuming that the distance between the rear principal point of the lens 13 and the front principal point of the fθ lens 6 is d, and the focal lengths of the lens 13 and the fθ lens system 6 are fcy3 and f$_{fθ}$ respectively, distance S″ between the rear principal point of the fθ lens system 6 and the synthesized focal point of the lens 13 and the fθ lens system 6 can be represented as:

$$S'' = \frac{f_{fθ}(fcy^3 - d)}{fcy^3 + f_{fθ} - d}$$

That is, the parallel light beam which has been parallelized by the collimator lens 2 is made to enter the lens 13, the incident light beam then being made to form an image at position S″.

Assuming that the quantity of the field curvature is ΔIM and the quantity of corresponding corrective movement of the lens 13 is Δcy3, the quantity of the corresponding corrective movement Δcy3 can be represented as:

$$\Delta cy3 = \frac{\Delta IM \cdot f_{fθ}^2}{(S'' - \Delta IM - f_{fθ})(S'' - f_{fθ})}$$

Therefore, when the lens 13 is moved separately from the lens 4 described in the first embodiment, the field curvature can be corrected in both main and sub-scanning directions.

Inversely to the first embodiment, the present invention can be applied to the correction in only the main scanning direction while correcting the field curvature in the sub-scanning direction by a lens system.

FIGS. 7 and 8 illustrate an example in which the correction is conducted in both the main and the sub-scanning directions, where FIG. 7 illustrates the aberration before the field curvature is corrected and the same after the field curvature has been corrected in both the main scanning and the sub-scanning directions. FIGS. 7A, 7B, and 7C illustrates the aberrations before the correction, and FIG. 7D illustrates the fθ characteristic. FIG. 7E illustrates the aberration of the field curvature after the correction. FIG. 8 corresponds to FIG. 5 in which the quantities of the field curvature in the main scanning and sub-scanning directions are plotted with respect to the scanning angle (the rotational angle of the polygon mirror 5).

The field curvature in the sub-scanning direction is corrected by moving sinusoidally the cylindrical lens and the field curvature in the main scanning direction is corrected by moving cosine-wisely the cylindrical lens. That is, in the example shown in FIG. 8, the field curvatures are corrected by moving the first cylindrical lens 4 in accordance with:

$$\Delta IM(\theta) = -\Delta IS.\cos(18\theta) + \Delta IS'$$

and by moving the second cylindrical in accordance with:

$$\Delta IM(\theta) = \Delta IM.\sin(6\theta).$$

FIGS. 7A to 7E and 8 are drawn under the condition that N=6, and n=3 when the sub-scanning is conducted, while n=1 when the main scanning is conducted.

Figure 9A:
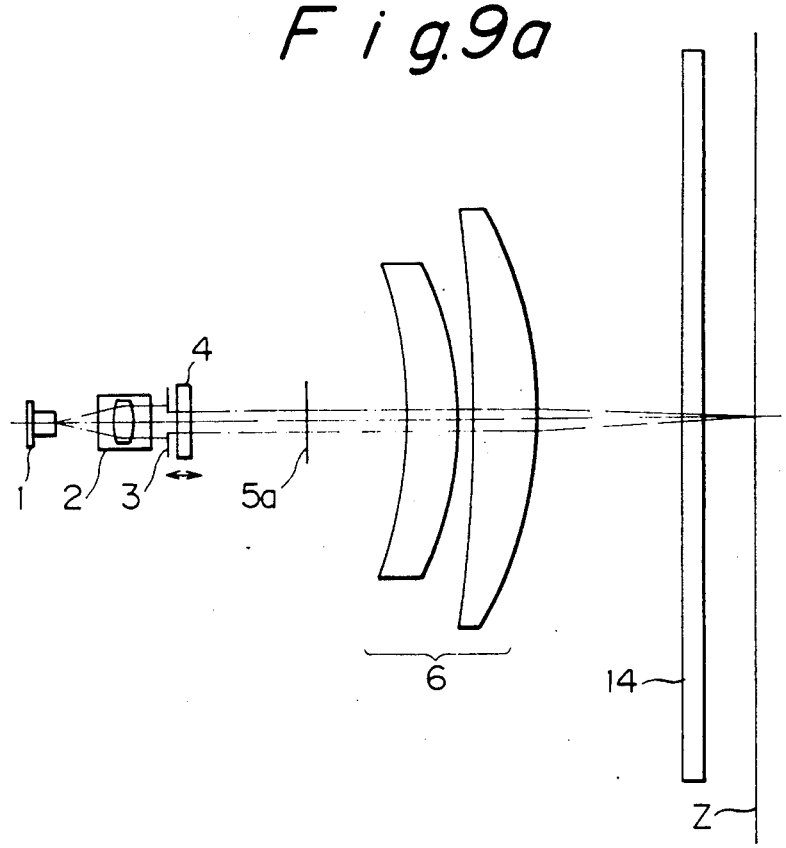
FIGS. 9A and 9B are schematic views which illustrate the optical systems of the other embodiments of the scanning optical apparatus according to the present invention, where
Figure 9B:
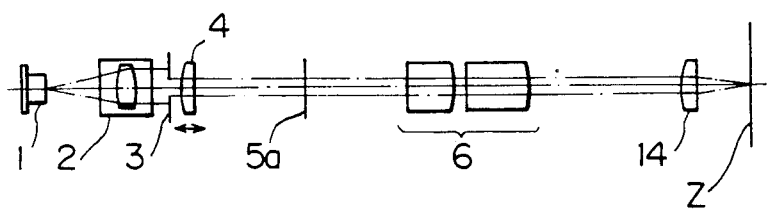
Figure 10:
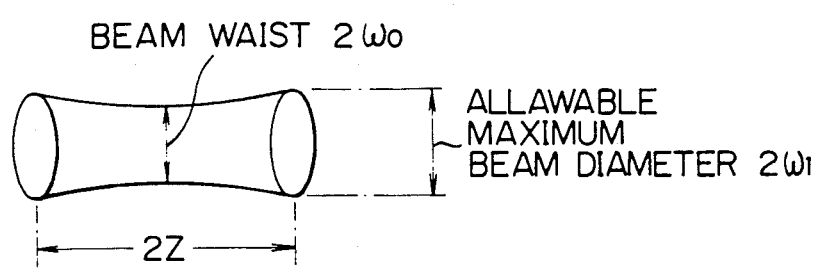
FIG. 10 illustrates the relationship between the distance from the beam waist portion on the surface of the medium to be scanned to the allowable maximum beam diameter portion and the quantities of the field curvature.

FIGS. 9A and 9B illustrate an example in which the present invention is applied to a scanning optical system whose fθ lens system 6 comprises a long cylindrical lens. The correction of the field curvature in the optical system described above can be conducted similarly by moving the lens 4 in the direction of the optical axis.

FIG. 9A is a schematic view which illustrates the optical system in the deflective scanning plane (main scan). FIG. 9B is a schematic view which illustrates the optical system on a plane (sub-scan) perpendicular to the deflective scanning plane and including the optical axis.

As a mechanism for moving the first cylindrical lens 4 and the third cylindrical lens 13 according to the present invention; an actuator used in an optical pickup or the like can be used.

As described above, in the scanning optical system according to the present invention, the first cylindrical lens 4 and/or the third cylindrical lens 13 are disposed movably in the direction of the optical axis. As a result, there is established the correction mechanism which is capable of correcting the field curvature by periodically moving the first cylindrical lens 4 and/or the third cylindrical lens 13 in the direction of the optical axis in synchronization with the rotational scanning of the rotary polygon mirror. Therefore, the field curvature can be precisely reduced.

In the scanning optical system using a laser beam source, distance Z from a portion of the allowable maximum diameter 2ω$_1$ of the beam to the waist portion of the beam can be represented from the Gaussian propagation equation as follows:

$$Z = \frac{\pi^2 \omega_0^2}{\lambda} \sqrt{\left(\frac{\omega_1}{\omega_0}\right)^2 - 1}$$

provided that the allowable maximum beam diameter is 2ω$_1$, the diameter of the waist portion of the beam is 2ω$_0$, and wavelength of beam used is λ. A fact is further known that the field curvature must be limited to 2Z or less. If the field curvature is reduced, the allowable maximum diameter of the beam can be also reduced. Therefore, a high density scanning optical system which can overcome the nonuniformity can be provided.

Furthermore, according to the present invention, since there is no necessity for improving the performance of the fθ lens system in developing the high density scanning optical system, design and machining of the optical system can be readily conducted and thereby a low cost apparatus can be provided.

According to the above-described embodiments, since the optical system is adapted in such a manner that the magnification of the fθ lens system of the optical system shown in FIGS. 2 and 6 is larger than that of the fθ lens system of the optical system shown in FIG. 9, the optical system shown in FIGS. 2 and 6 can conduct a large correction of the field curvature by a small movement of the first and the third cylindrical lenses.

In the embodiments shown in FIGS. 1 to 10, the method is employed in which the field curvature correction in the sub-scanning direction is conducted by employing the first cylindrical lens 4 in the first image forming optical system, and by periodically moving the first cylindrical lens 4 in the direction of the optical axis in synchronization with the rotary scanning of the rotary polygon mirror.

On the other hand, in order to raise the density of writing by the deflective scanning, the width of the light beam to enter the fθ lens on the main scanning side must be enlarged as much as possible. Assuming that the focal length of the fθ lens is f, the density is 1/2ω, and the wavelength of light beam used is λ, the following relation holds for the width of the light beam:

$$d = 2\omega \sqrt{(\lambda f/\pi \omega^2)^2 + 1}$$

As apparent from this equation, d becomes larger when f becomes longer (writing width is large) and ω is decreased (density becomes high).

However, if d is enlarged, problems take place in that the width of the first cylindrical lens 4 in the main scanning direction must be lengthened, causing the weight of the first cylindrical lens 4 to be increased. Therefore, a large power is necessarily needed to move the lens 4 whose weight has been increased. Furthermore, the period of the movement cannot be shortened, and the distance of the movement cannot be enlarged.

Furthermore, the moving mechanism for the lens 4 comprises a mechanism similar to an actuator such as the pickup for the optical disc or the like as described above, the movement distance δ can be represented as:

$$\delta \times (2\pi f)^2 = I.B.l/m$$

whereδ: the distance of movement, f: moving frequency
I: input current, B: density of magnetic flux
l: effective length of the coil
m: weight of article to be moved Therefore, when the weight is increased, the movement distance is shortened in inverse proportion of it, and the moving frequency is also reduced. Therefore, when the weight of the lens 4 is increased problems arise in that the quantity of field curvature which can be corrected is reduced and the scanning speed is lowered.

Therefore, another embodiment of the scanning optical apparatus of the present invention is adapted in such a manner that the cylindrical optical system constituting the first image forming optical system is constituted by a Fresnel lens as an alternative to the cylindrical lens.

Figure 11A:
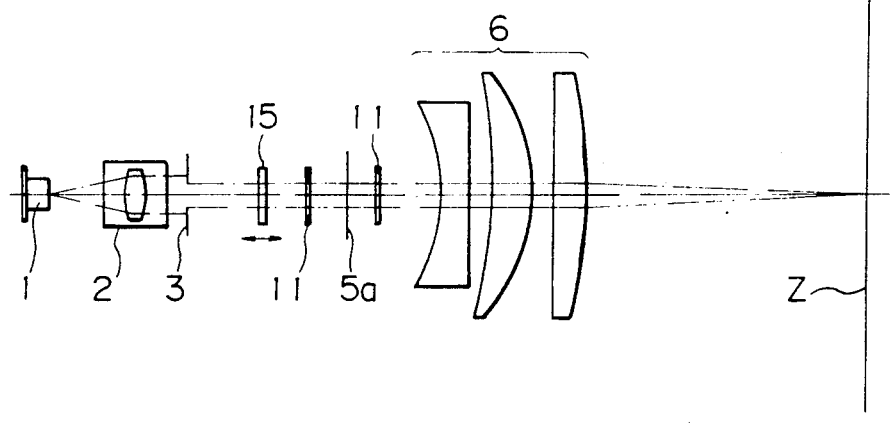
FIGS. 11A and 11B are schematic views which illustrate the optical systems of the other embodiments of the scanning optical apparatus according to the present invention which is constituted in such a manner that the first image forming optical system thereof is formed with a Fresnel lens, where
Figure 11B:
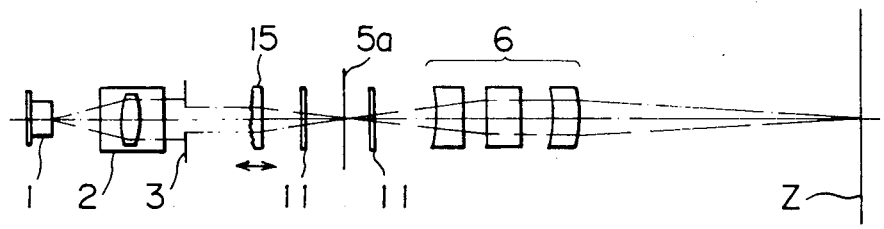

FIGS. 11A and 11B illustrate an embodiment in which a Fresnel lens is employed in the first image forming optical system of the scanning optical apparatus according to the present invention. FIG. 11A is a schematic view which illustrates the optical system on the deflective scanning plane (main scanning plane). FIG. 11B is a schematic view which illustrates the optical system on the plane (surface to be sub-scanned) perpendicular to the deflective scanning plane and including the optical axis. According to the embodiment shown in FIGS. 11A and 11B, a first image forming optical system which can be periodically moved in the direction of the optical axis in accordance with the deflective scanning of the rotary polygon mirror is constituted by a Fresnel lens 15.

Figure 12A:
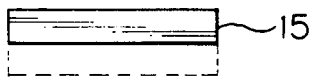
FIGS. 12A, 12B, and 12C are schematic views which illustrate an example of the Fresnel lens forming the first image forming optical system of the optical system shown in FIGS. 11A and 11B, where
Figure 12B:
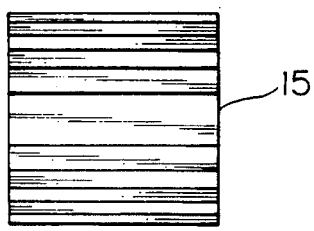
Figure 12C:
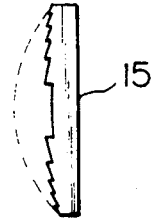

Since the thickness of the Fresnel lens 15 can be substantially halved as compared with the thickness of a usual cylindrical lens (designated by a dashed line in the drawing) as shown in FIGS. 12A, 12B, and 12C, the weight of the first image forming optical system can be reduced.

Therefore, the weight of the first image forming optical system can be reduced by using the Fresnel lens 15 as an alternative to the first and third cylindrical lenses 4 and 13 according to the above-described embodiments. As a result, the movement required at the correction of the field curvature can be readily conducted.

When a mechanism similar to the acuator for use in the pickup for an optical disc is employed as the moving mechanism for the first image forming optical system, the distance of the movement of the lens can be expressed by:

$$\delta \times (2\pi f)^2 = I.B.l/m$$

Therefore, the current I required to move the lens can be reduced depending on the reduction in weight m, when the distance of movement of the lens and the frequency at the time of the movement of the lens are set to be the same as the case in which the cylindrical lens is used. Provided that the current is constant, the use of the Fresnel lens causes the frequency to be increased and the distance of the movement to be lengthened. As a result, the writing scanning speed can be raised and the quantity of the correction of the field curvature can be enlarged. Therefore, the design of the fθ lens can be further freely conducted and the difficulty taking place at the design can be eliminated. As a result, the cost of the fθ lens can be reduced.

Then, the other embodiment of the scanning optical apparatus according to the present invention will be described.

With the scanning optical apparatus according to this embodiment, the above-described problem in terms of the quantity of the correction of the field curvature and a problem in raising the scanning speed are intended to be overcome. In order to solve these problems, an expander optical system having power in only the deflective scanning plane is disposed in an optical path existing between the cylindrical lens 4 and the deflective reflection surface 5a of the rotary polygon mirror, the cylindrical lens 4 constituting the first image forming optical system of the optical system shown in FIG. 2.

Figure 13A:
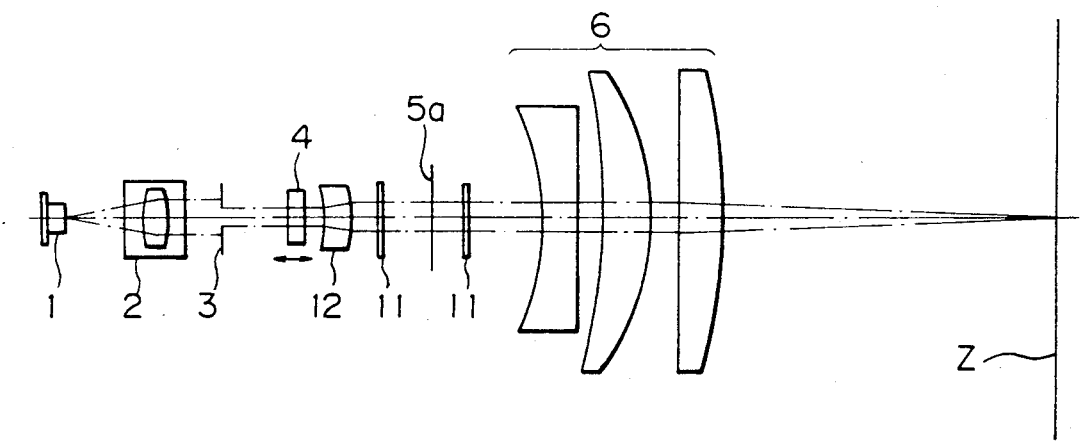
FIGS. 13A and 13B are schematic views which illustrate the scanning optical system of the other embodiment of the scanning optical apparatus according to the present invention, the scanning optical system being provided with an expander optical system, where
Figure 13B:
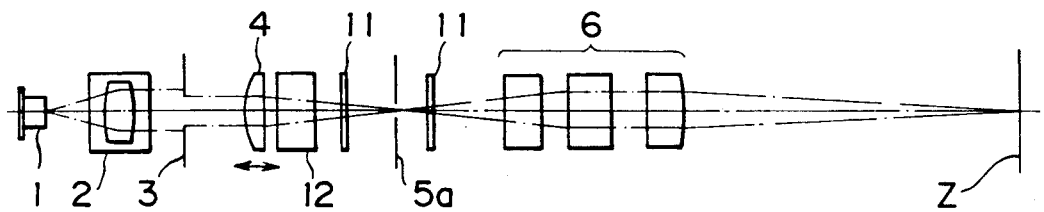

FIGS. 13A and 13B illustrate an example of the structure of the scanning optical apparatus according to this embodiment, the illustrated scanning optical system being adapted in such a manner that an expander lens 12 is disposed in an optical path existing between the first cylindrical lens 4 serving as the first image forming optical system and the deflective reflection surface 5a of the rotary polygon mirror 5. FIG. 13A is a schematic view which illustrates the optical system on the deflective scanning plane (the main scanning plane). FIG. 13B is a schematic view which illustrates the optical system on the plane (the sub-scanning plane) perpendicular to the deflective scanning plane and including the optical axis.

In the optical system whose construction is shown in FIGS. 13A and 13B, the width of the main scanning of the light beam to be made to enter the fθ lens system 6 is determined by the writing density as described above. According to this embodiment, since the width of the light beam to be made to enter the fθ lens system 6 is the width of the light beam to be emitted from the expander lens 12, the width of the light beam to be made to enter the expander lens 12 can be made smaller than the width of the light beam to be emitted from the fθ lens system 6. The width of the lens 4 can also be reduced.

The width of the light beam to be made to enter the lens 12 is determined by the aperture 3. If the width of the aperture 3 is reduced, the efficiency in using light is lowered. Therefore, the width of the light beam emitted from the collimator lens 2 must be reduced as compared to that of the conventional apparatus.

The reduction in the width of the light beam emitted from the lens 2 causes the size of the lens 2 to be reduced. In addition, the focal length can be shortened. Therefore, the size of the whole of the optical system can be reduced, and thereby the weight of the same can be reduced.

Therefore, in the scanning optical system having the optical system whose construction is as shown in FIGS. 13A and 13B, since the size of the first cylindrical lens 4 can be reduced, the lens 4 can be moved at high speed and the distance of the movement of the same can be lengthened. In addition, the moving frequency can be raised.

Consequently, according to the scanning optical apparatus shown in FIGS. 13A and 13B, the quantity of correction of the field curvature can be enlarged and the scanning speed can be raised.

Figure 14A:
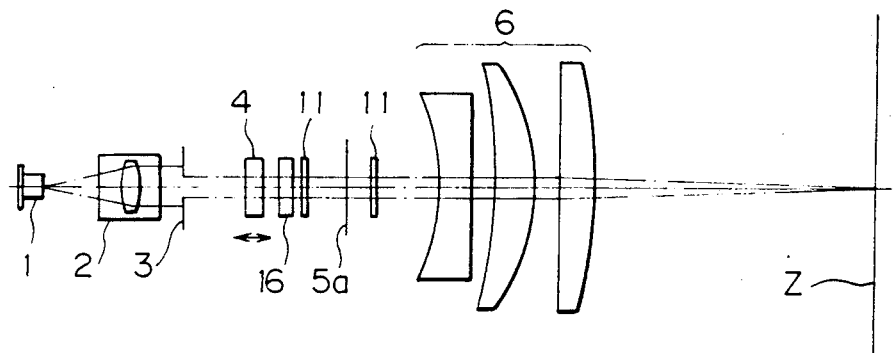
FIGS. 14A and 14B are schematic views which illustrate the optical scanning system of the other embodiments of the scanning optical apparatus according to the present invention each of which is provided with an enlarging optical system, where
Figure 14B:
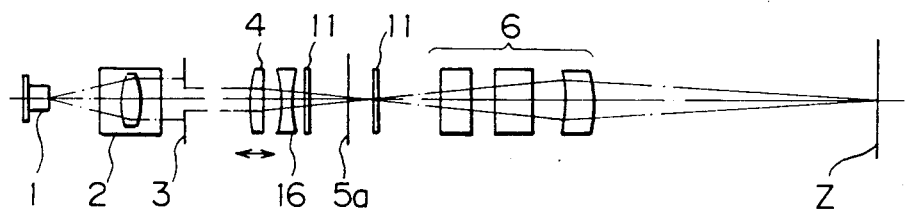

FIGS. 14A and 14B illustrate the other example of the structure of the scanning optical system for the purpose of solving the above-described problems. Referring to the FIGS. 14A and 14B, a scanning optical system is shown which is adapted in such a manner as to dispose an enlarging lens 16 capable of enlarging the quantity of the movement of the image forming positions realized by the lens 4 in accordance with the movement of the lens 4, the enlarging lens 16 being disposed in an optical path existing between the first cylindrical lens 4 serving as the first image forming optical system and the deflective reflection surface 5a of the rotary polygon mirror 5. FIG. 14A is a schematic view which illustrates the optical system on the deflective scanning plane (the main scanning plane). FIG. 14B is a schematic view which illustrates the optical system on the plane (the sub-scanning plane) perpendicular to the deflective scanning plane and including the optical axis.

In the optical system shown in FIGS. 14A and 14B, the enlarging optical system is constituted by, for example, a cylindrical optical system or the like having power in the same direction as that of the lens 4 which is moved in the direction of the optical axis in accordance with the deflective scan.

Figure 15A:
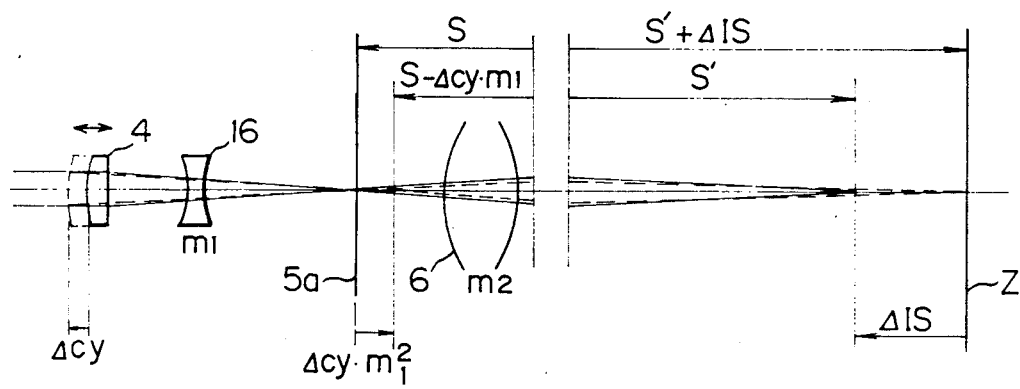
FIGS. 15A and 15B illustrate a method of correcting the field curvature by the optical system shown in FIGS. 14A and 14B.
Figure 15B:
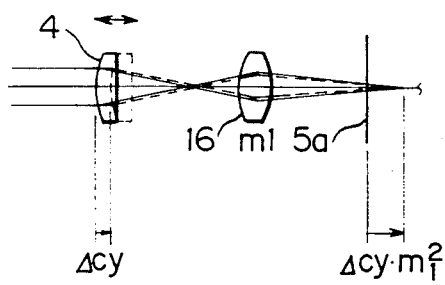

FIG. 15A illustrates a method of correcting the field curvature conducted by the scanning optical system shown in FIGS. 14A and 14B. Referring to FIGS. 15A and 15B, the correction of the field curvature which corresponds to the movement of the cylindrical lens 4 shown in FIGS. 14A and 14B will be described.

Referring to FIG. 15A, when the lens 4 is moved by $\Delta cy$, the correction quantity $\Delta IS$ of the field curvature in the above-described scanning optical apparatuses shown in FIGS. 1 to 10 can be represented by:

$$\Delta IS \approx \Delta cy \cdot m_2^2$$

where $m_2$: the magnification of the fθ lens.

On the other hand, in the scanning optical system according to this embodiment, since the enlarging lens 16 is interposed between the lens 4 and the deflective reflection surface 5 of the rotary polygon mirror 5, the position of the linear image formed in the vicinity of the deflective reflection surface 5a of the rotary polygon mirror 5 is moved by about $\Delta cy \cdot m_1^2$ ($m_1$: the magnification of the enlarging lens 16) with respect to the movement $\Delta cy$ of the lens 4. The movement of the position of the thus formed image corresponds to the quantity of the movement of the lens 4, and the quantity of the correction of the field curvature in this embodiment in which the enlarging lens 16 is added becomes larger as:

$$\Delta IS \approx \Delta cy \cdot m_1^2 \cdot m_2^2$$

Therefore, according to the scanning optical system according to this embodiment shown in FIGS. 14A and 14B, the quantity of correction of the field curvature can be enlarged without the necessity of lengthening the distance of the movement of the lens 4.

FIG. 15A illustrates an example in which a lens having the negative power is employed as the enlarging lens 16. A lens having the positive power as shown in FIG. 15B may be employed as the enlarging lens 16.

As shown in FIG. 14A, substantially parallel light beam is usually made to enter the fθ lens system 6 at the main scan. The light beam to be made enter the fθ lens system 6 is usually formed by substantially parallelized the light beam emitted from the laser beam source by the collimator lens 2. Therefore, when the cylindrical lens having power in the sub-scanning direction is used similarly to the case of the lens 4, the parallel state of the substantially parallelized light beam to be made to enter the fθ lens system 6 can be secured.

However, this fact is not applied to the case in which the light beam to be made to enter the fθ lens system 6 is not parallelized, and the enlarging lens 16 may have the power in the main scanning direction.

The enlarging lens 16 according to this embodiment is not limited to the optical system shown in FIGS. 14A and 14B. It can be applied to any of the scanning optical systems shown in FIGS. 1, 2, and 6. It is preferable that an enlarging lens having power in the main scanning direction is employed in the scanning optical system shown in FIG. 6 and carrying out the correction of the field curvature in the main scanning direction. On the other hand, it is preferable that a spherical lens having power in both the main scanning and sub-scanning directions or a toroidal lens having predetermined different magnifications in the main scanning and sub-scanning directions is employed as the enlarging lens of the scanning optical system for correcting the field curvature in both the main scanning and sub-scanning directions.

As described above, the quantity of correction of the field curvature in the case where no enlarging lens 16 is used can be represented as follows:

$$\Delta IS \approx \Delta cy \cdot m_2^2$$

In order to enlarge the quantity of the correction without use of an enlarging lens, it might be considered to employ a construction in which the magnification of the $f\theta$ lens system is raised. However, in order to raise the magnification of the $f\theta$ lens system 6, the other characteristics of the $f\theta$ lens system 6 such as the $f\theta$ characteristic, the spherical aberration, and the coma aberration or the like must be improved. Therefore, it is not preferable that the magnification of the $f\theta$ lens system 6 is raised, since the probability of freely designing the lens is limited.

As described above, in the scanning optical apparatus having the scanning optical system constructed as shown in FIGS. 14A and 14B, the quantity of movement of the image forming position, at which the first image forming optical system forms an image, in accordance with the movement of the first image forming optical system can be increased with such a simple constitution that the enlarging optical system is disposed in the optical path existing between the first image forming optical system and the deflective reflection surface of the rotary polygon mirror. Therefore, the quantity of correction of the field curvature can be increased.

Therefore, in the scanning optical apparatus having the scanning optical system constructed as shown in FIGS. 14A and 14B, the quantity of correction of the field curvature can be enlarged without the necessity of lengthening the movement of the first image forming optical system. As a result, a high speed scanning can be conducted. Furthermore, the size of the moving mechanism for the first image forming optical system can be reduced so that the current to be input to the moving mechanism can be reduced.

An example of the scanning optical system in which the expander lens is disposed is shown in FIGS. 13A and 13B. Furthermore, an example in which the enlarging lens is disposed is shown in FIGS. 14A and 14B. The functions of the above-described two lenses may be realized by a sole lens.

Figure 13C:
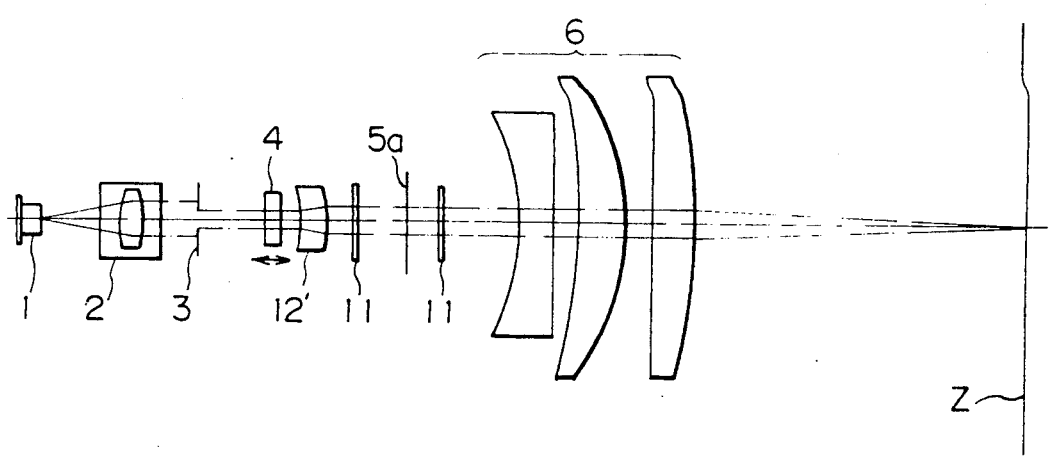
FIGS. 13C and 13D illustrate examples in which the expander optical system uses a spherical expander lens in both the main scanning and sub-scanning directions in the scanning optical system shown in FIGS. 13A and 13B, where
Figure 13D:
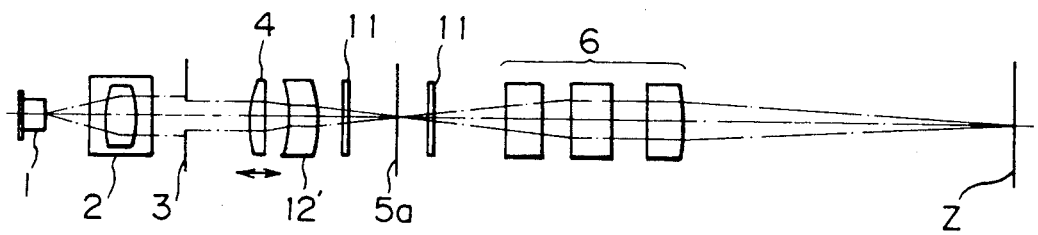

FIGS. 13C and 13D illustrate an example in which the function of the aforementioned two lenses can be realized by a sole lens, and in which the expander 12 shown in FIGS. 13A and 13B is adapted to be an spherical expander lens 12' having a curvature in both the main scanning and sub-scanning directions. The expansion ratio of the lens 12' is the same as that of the expander 12 shown in FIGS. 13A and 13B. Provided that the expansion ratio is $m_1$, the lens 12' functions as the enlarging lens 16 shown in FIGS. 14A, 14B, 15A, and 15B whose magnification is $m_1$ in the sub-scanning direction. Therefore, the lens 12' is necessary to have function as the expander lens at least in the main scanning direction. Even if the lens 12' has the function as an expander lens in the sub-scanning direction, it acts as an expander lens in the main scanning direction, while it acts as an enlarging lens in the sub-scanning direction. As a result, one spherical expander lens 12' can serve as a lens having the above-described two functions.

Then, a further embodiment of the present invention will be described with reference to FIGS. 16 to 22. First, a mechanism for correcting the field curvature by moving or vibrating the first image forming optical system will be described in detail.

Figure 16:
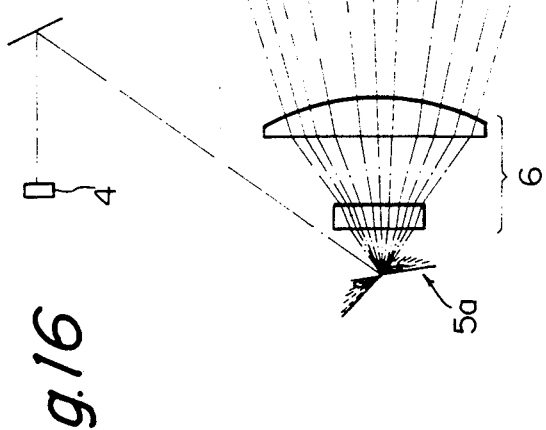
FIG. 16 is a schematic view which illustrates the optical system for correcting the field curvature and the state of the field curvature.

FIG. 16 illustrates an example of the optical system for correcting the field curvature, where an optical system for A4 size, 30 CPM, 400 DPI and a state of the field curvature are shown.

Figure 17:
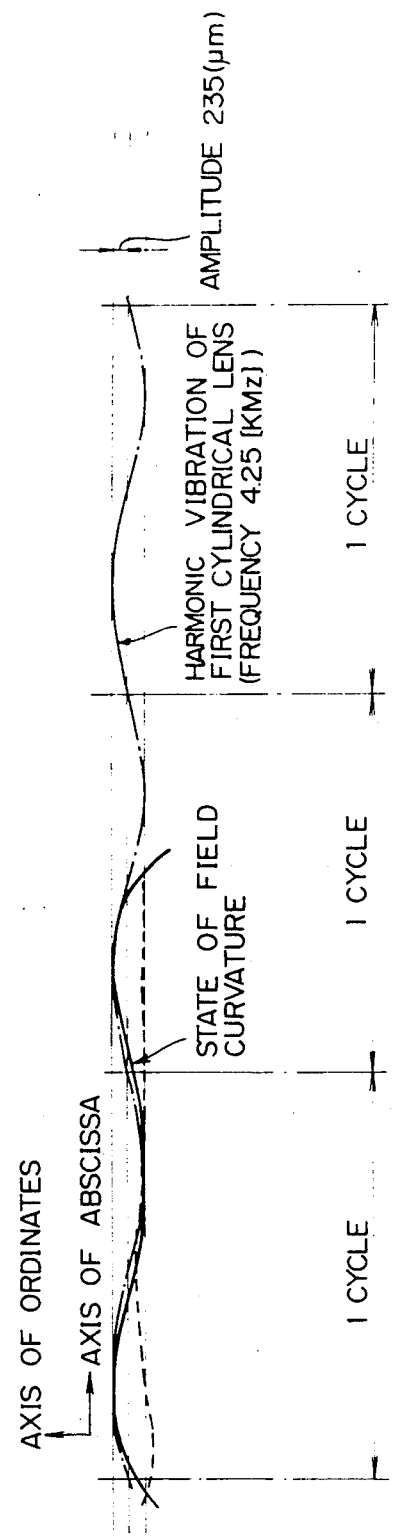
FIG. 17 is a graph which illustrates the method of the correction of the field curvature.

In the case of the optical system of the type described above, the first cylindrical lens must be harmonically vibrated at a frequency of 4.25 (kHz) and an amplitude of 235 ($\mu$m) as shown in FIG. 17 for the purpose of correcting the field curvature.

Referring to FIG. 17, the axis of abscissa and the axis of ordinate are different for the curve showing the state of the field curvature and that for the harmonic vibration of the first cylindrical lens. That is, the axis of abscissa for the field curvature shows the positional coordinate of the photosensitive body in the main scanning direction, while the axis of ordinate shows the quantity of the field curvature. On the other hand, the axis of abscissa for the harmonic vibration of the first cylindrical lens shows time, while the axis of ordinate shows the quantity of amplitude (the quantity of the movement).

In order to correct the field curvature as described above, a mechanical system for harmonically moving the first cylindrical lens as shown in FIG. 17 must be provided. Then, examples of the mechanical system will be described with reference to FIGS. 18A, 18B, and 18C.

Figure 18A:
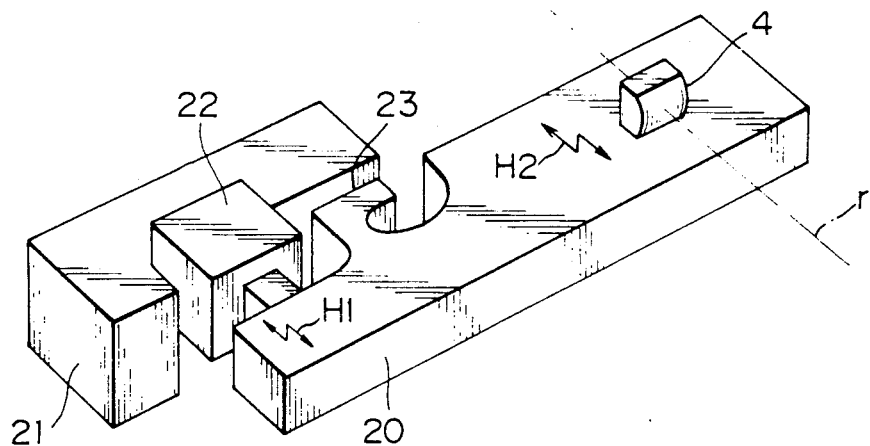
FIG. 18A is a schematic perspective structural view which illustrates an embodiment of the mechanical system for harmonically vibrating a first cylindrical lens.

FIG. 18A illustrates an example of the mechanical system in which a laminated type piezoelectric actuator and a displacement enlarging mechanism are combined. The first cylindrical lens 4 is fastened to a displacement enlarging mechanism 20, and the laminated type piezoelectric actuator 22 is secured to a fixing member 21. The displacement enlarging mechanism 20 is provided with a fulcrum 23.

In the mechanism constructed as shown in FIG. 18A, the actuator 22 is displaced at a predetermined frequency by applying voltage of a predetermined frequency to the actuator 22. The displacement of the actuator 22 H1 is magnified (amplified) by the displacement enlarging mechanism 20 which utilizes the principle of the fulcrum. As a result, the lens 4 is vibrated by an enlarged displacement H2.

Figure 18B:
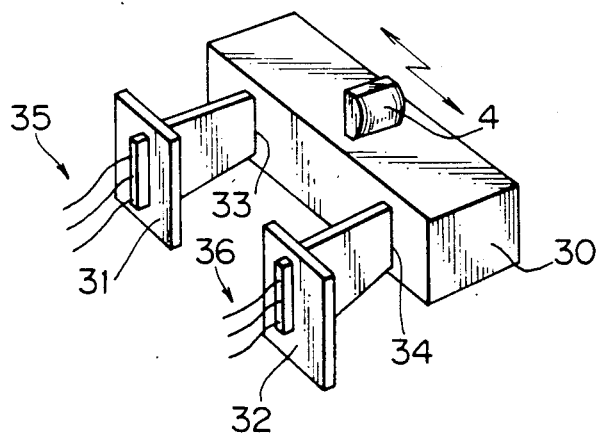
FIG. 18B is a schematic perspective structural view which illustrates a modification of the mechanical system for harmonically vibrating the first cylindrical lens.

FIG. 18B illustrates a mechanical system of a laminated bimorph type piezoelectric actuator type, in which the lens 4 is secured to a base 30, and laminated bimorph type piezoelectric elements 31 and 32 are respectively connected to lead wires 35 and 36. The piezoelectric elements 31 and 32 are secured to the base 30 at fixing portions 33 and 34.

In the mechanical system of the laminated bimorph type piezoelectric actuator type, a predetermined voltage is applied to the piezoelectric elements 31 and 32 so as to vibrate the base 30 by the piezoelectric devices 31 and 32. As a result, the lens 4 can be vibrated.

Figure 18C:
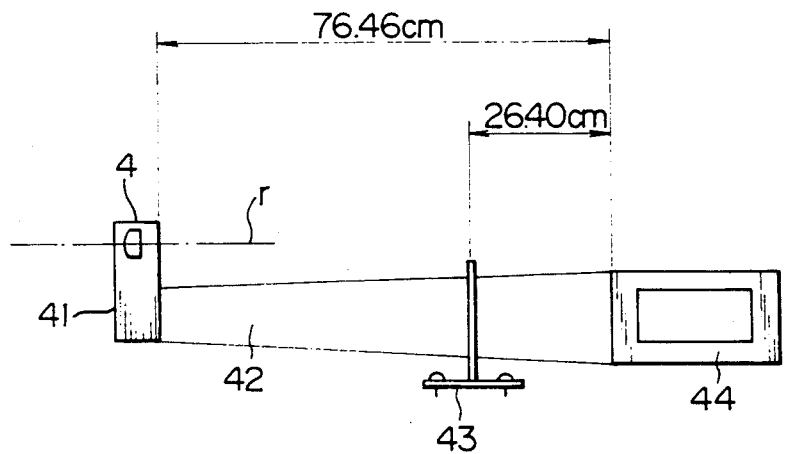
FIG. 18C is a schematic perspective structural view which illustrates another modification of the mechanical system for harmonically vibrating the first cylindrical lens.

FIG. 18C illustrates a mechanical system of a type in which a piezoelectric, electrostrictive or magnetostrictive vibrator and a horn serving as an amplitude enlarging member are used. The lens 4 is secured to a securing holder 41 to which a horn 42 is fastened. The horn 42 is secured by a securing flange 43. A vibrator 44 utilizing the piezoelectricity, electrostriction, or magnetostriction is secured to the horn 42. The securing flange 43 is secured to the outer base or the like.

In the mechanical system shown in FIG. 18C, the amplitude of vibration generated by the vibrator 44 is enlarged by the horn 42 so that the securing holder 41 is vibrated. As a result, the lens 4 is vibrated.

In the mechanical systems shown in FIGS. 18A, 18B, and 18C, the piezoelectric actuator using a piezoelectric element as the power source of the vibration is employed. The piezoelectric actuator of the type described above has a hysteresis as designated by a graph shown in FIG. 19. That is, the quantity of the displacement of the piezoelectric actuator is varied depending upon the increase/decrease in the voltage to be applied to the piezoelectric actuator.

Therefore, in the mechanical system of the type in which the piezoelectric actuator is employed, the harmonic vibration as shown in FIG. 17 cannot be obtained due to the influence of the above-described hysteresis in the case where the open-loop control is used.

Therefore, in order to eliminate the influence of the piezoelectric actuator, the apparatus according to the present invention further comprises: means for detecting any of the quantity of movement (the quantity of the amplitude) of a first cylindrical lens 4, the quantity of the amplitude of the piezoelectric actuator as a drive source for moving or vibrating the lens 4, or the quantity of the amplitude of the other vibration portion to be detected for the purpose of obtaining the above-described two quantities; and means for controlling the movement or the vibration of the lens 4 by feeding back the thus detected quantity to the drive circuit of the drive circuit. As a result, the influence of the hysteresis of the drive source is reduced so that a predetermined harmonic vibration is obtained.

Figure 20:
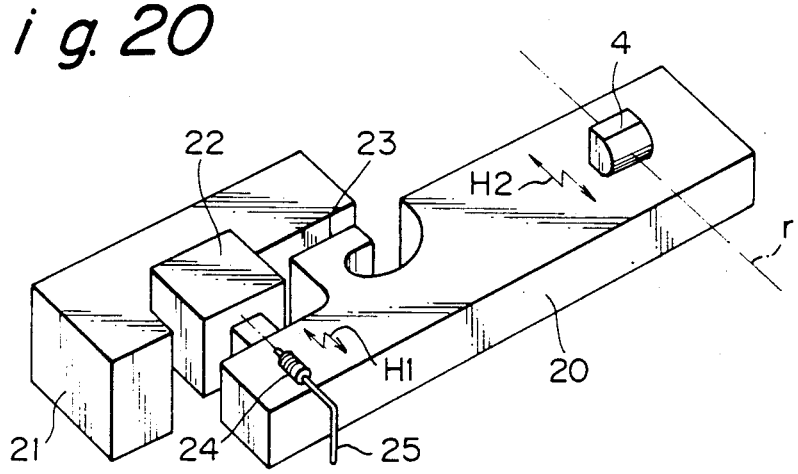
FIG. 20 is a schematic perspective structural view which illustrates an example of a mechanical system for harmonically vibrating the first cylindrical lens provided with a displacement (amplitude) quantity detection mechanism.

FIG. 20 illustrates an embodiment of the mechanical system according to the present invention. The mechanical system according to this embodiment is provided with a displacement quantity detection mechanism in addition to the driving mechanical system of a type in which the laminated bimorph type piezoelectric actuator 22 shown in FIG. 18A is combined with the displacement enlarging mechanism 20. The displacement quantity detection mechanism comprises an iron core 25 and a coil 24. The mechanical system according to this embodiment is adapted to detect the quantity of the displacement of the actuator 22 by detecting the electromotive force generated by the relative movement of the coil 24 secured to the displacement enlarging mechanism 20 (vibration side) and the iron core 25 secured to the scanning optical apparatus.

In this case, the quantity of displacement of a portion of the displacement enlarging mechanism 20, which portion is close to the actuator 22, is detected. As an alternative to this, the quantity of displacement of the actuator 22 may be directly detected by securing one of the coil 24 and the iron core 25 to the actuator 22. Similarly, quantity of displacement of the lens 4 may be directly detected.

Then, the other example of the displacement quantity (the amplitude quantity) detection mechanism will be described referring to FIG. 21.

Figure 21:
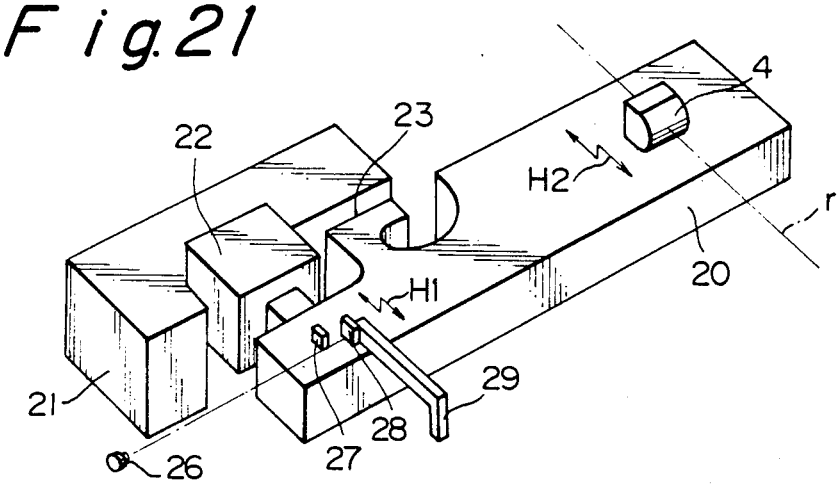
FIG. 21 is a schematic perspective structural view which illustrates another modification of the mechanical system for harmonically vibrating the first cylindrical lens provided with the displacement (amplitude) quantity detection mechanism.

The detection method according to the detection mechanism shown in FIG. 21 is a method for detecting the quantity of the displacement by detecting a light beam emitted from a light source 26 such as a semiconductor light emitting device (LED) or a semiconductor laser (LD) with a light receiving element 28. This method utilizes the fact that the light quantity of the light beam made to enter the light receiving element 28 varies in accordance with the displacement of the laminated type piezoelectric actuator 22.

That is, in the detection mechanism shown in FIG. 21, a light shield wall 27 disposed on a vibrated portion such as the displacement enlarging mechanism 20 or the like screens the light beam emitted from the light source 26 in accordance with the vibration of the above-described vibrated portion. In accordance with the light screening of the light shield wall 27, the quantity of the light beam received by the light receiving element 28 is varied. The quantity of the displacement of the vibrated portion is detected by utilizing the variation of the quantity of the received light beam.

Referring to FIG. 21, the same reference numerals as those shown in FIG. 20 represent the same elements. The detection mechanism shown in FIG. 21 is provided with a support member 29 secured at one end portion thereof to a fixing portion of the scanning optical apparatus, and supporting the light receiving element 28 at the other end portion thereof.

Figure 22:
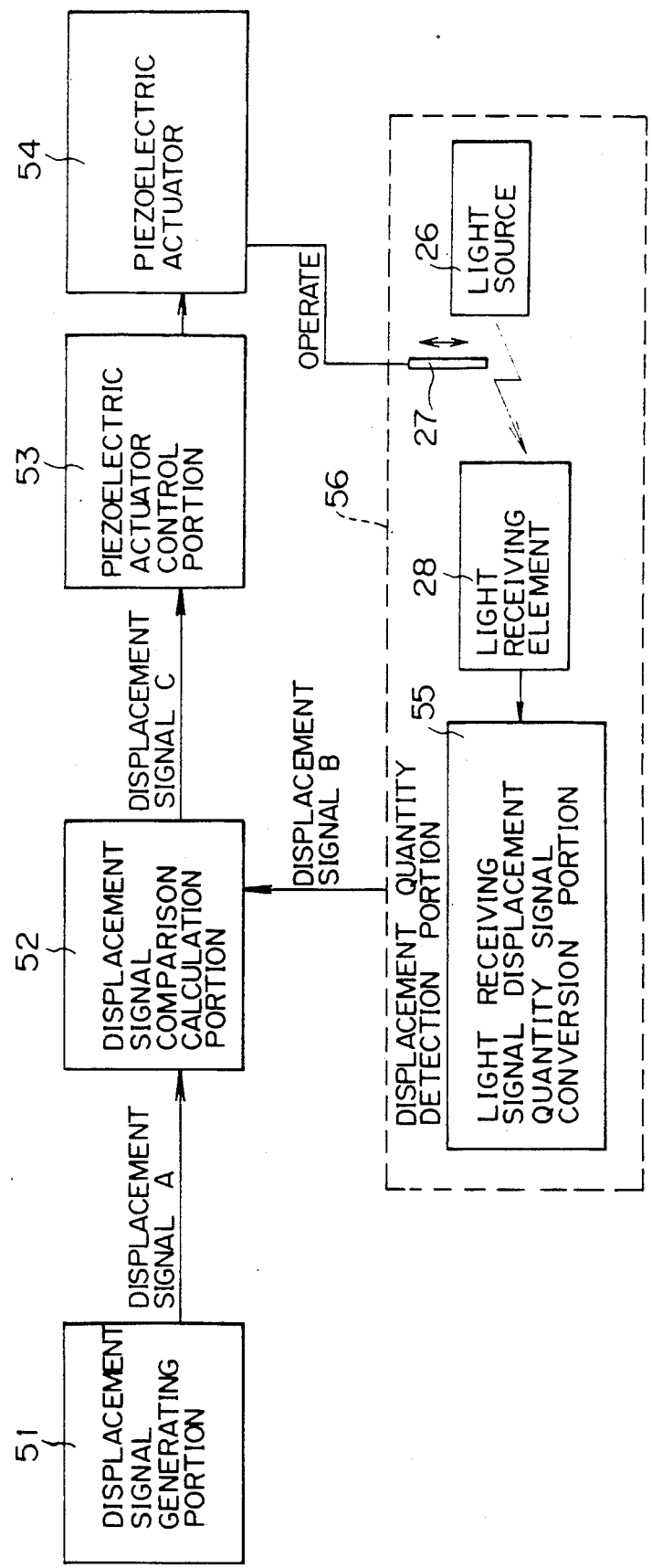
FIG. 22 is a block diagram which illustrates the schematic structure of a feedback control system for controlling the mechanical system for harmonically vibrating the first cylindrical lens and illustrates the flow of the control.

Referring to FIG. 22, the feedback control in the case where the moving mechanism and the displacement detection mechanism shown in FIG. 21 are used will be described.

The schematic construction of the feedback control system and the flow of the control are shown in FIG. 22 in the form of a block diagram.

As described above, the quantity of the movement of the first cylindrical lens 4 for the purpose of obtaining the quantity of the correction of the field curvature as shown in FIGS. 5, 8, and 17 can be represented as:

$$\Delta cy \approx \Delta lS/m$$

Therefore, a signal for moving the first cylindrical lens 4 by $\Delta cy$ is used as a set displacement signal. As shown in FIG. 22, a set displacement signal generating portion 51 is provided for the control system.

The set displacement signal generating portion 51 may be constituted by a device capable of outputting digital data, which have been previously stored in a ROM, in synchronization with the period of the deflection. Alternatively, it may be constituted by an analog sine wave generator.

The set displacement signal A used as a reference is compared with a displacement quantity signal B representing the quantity of the present displacement of the lens 4 in a displacement signal comparison and calculation portion 52. The result of this comparison is outputted, as a displacement signal C, to the piezoelectric actuator control portion 53. The relationship between the signals mentioned above may be represented as:

$$C = 2A - B.$$

The piezoelectric actuator control portion 53 which has received the displacement signal C determines and outputs the voltage to be applied to the piezoelectric actuator 54 on the basis of the displacement signal C. The piezoelectric actuator 54 moves the lens 4 via, for example, the displacement enlarging mechanism 20 shown in FIG. 21 on the basis of the thus-applied voltage. When the lens 4 is moved, the light shielding wall 27 disposed on the displacement enlarging mechanism 20 screens the light beam propagating from the light source 26 to the light receiving element 28. The light beam is screened partially or perfectly in accordance with the quantity of the displacement of the light shielding wall 27. As a result, the quantity of the light received by the light receiving element varies.

Thus, an electric signal is outputted from the light receiving element 28 depending on the quantity of the received light. The electric signal is converted into the displacement quantity signal B by a light receiving element signal-displacement quantity signal conversion portion 55 before being supplied to the displacement signal comparison and calculation portion 52.

Referring to FIG. 22, the portion from the light shielding wall 27 to the light receiving element signal-displacement quantity signal conversion portion 55 can be called a displacement quantity detection portion 56. The displacement quantity detection portion 56 may be of any type if it can detect the displacement of the first cylindrical lens 4 and output a signal corresponding to the quantity of the displacement to the displacement signal comparison and calculation portion.

Figure 19:
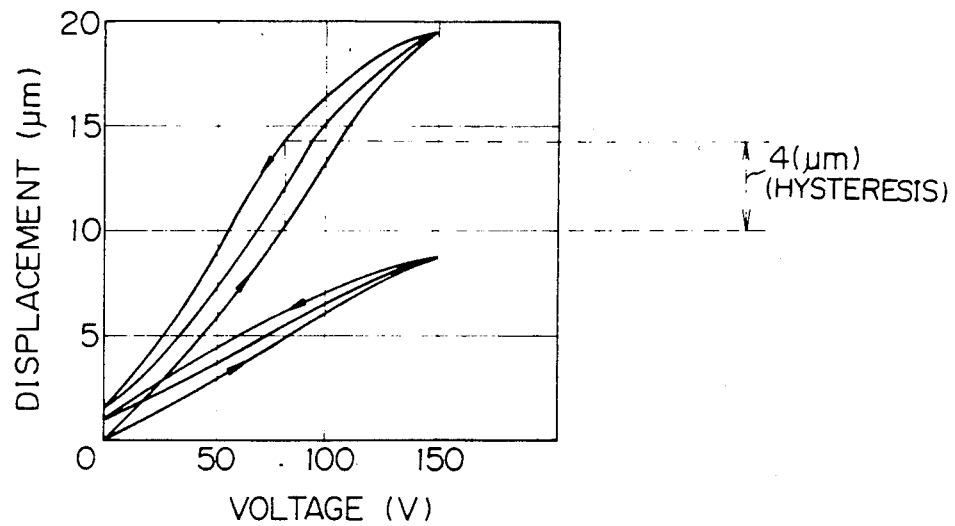
FIG. 19 is a graph which illustrates the voltage-displacement characteristic of a piezoelectric actuator used in the mechanical system for harmonically vibrating the first cylindrical lens.

As shown in FIG. 19, the piezoelectric actuator has a hysteresis, the level of the hysteresis being specified rough such as about ±10%.

However, according to the present invention, the piezoelectric actuator is controlled in a feedback control manner, corresponding to the quantity of the displacement of the lens 4. Therefore, a usual piezoelectric actuator may be employed.

As described above, the scanning optical apparatus according to the present invention and being provided with the above-described moving mechanism is so adapted as to detect the quantity of the displacement of the vibrating drive source of the moving mechanism system of the first cylindrical lens 4, and to feed back the detected quantity of the displacement to the drive circuit of the vibration drive source. As a result, a predetermined harmonic vibration can be conducted.

The method according to the present invention is effective to improve the hysteresis of the vibration drive source and also effective to correct the error in the vibration of the vibration system caused from the other factors since it is so adapted as to detect the quantity of the displacement of the vibration drive source or the same of the lens 4 and as to feedback the detected quantity of the displacement to the drive circuit.

In the description made above, there is shown an example in which the mechanism for moving the first cylindrical lens 4 in the direction of the optical axis is provided so as to move the lens 4 to thereby move the linear image forming position, whereby the field curvature is corrected. As an alternative to the construction in which the lens 4 is moved, a construction may be employed which is arranged in such a manner that a focal length variable optical element is added to the first image forming optical system so that the linear image forming position is moved by the focal length variable optical element.

In the scanning optical system using the rotary polygon mirror, in order to correct the field curvature, it is necessary to control the movement of the first image forming optical system in such a manner that the linear image forming position formed by the first image forming optical system such as the first cylindrical lens or the like is vibrated at several hundred to 1000 Hz in synchronization with the deflective scanning of the rotary polygon mirror. However, in the case where the control mentioned above is conducted by an open loop control, a problem arises in that the first image forming optical system is delayed in the operation thereof to thereby be unable to follow the operation of the rotary polygon mirror. As a result, the effect of correction of the field curvature is unsatisfactory.

Therefore, for the purpose of overcoming the above-described problem, in a scanning optical system according to the present invention, a beam splitter is disposed between the first image forming optical system of the first cylindrical lens or the like and the linear image forming position by the first image forming optical system, means for detecting the state of forming an image of the light beam of two light beams divided by the beam splitter, which one light beam does not propagate toward a second imaging optical system such as the fθ lens system or the like is provided, a signal corresponding to the state of the image formation detected by the detection means is feedback to a control system for controlling the movement or the vibration of the linear image forming position by the first image forming optical system, whereby the field curvature correction accurately following the deflective scanning is realized by a so-called closed loop control.

Then, a further embodiment of the present invention shown in FIGS. 23 to 44 will be described.

Figure 23:
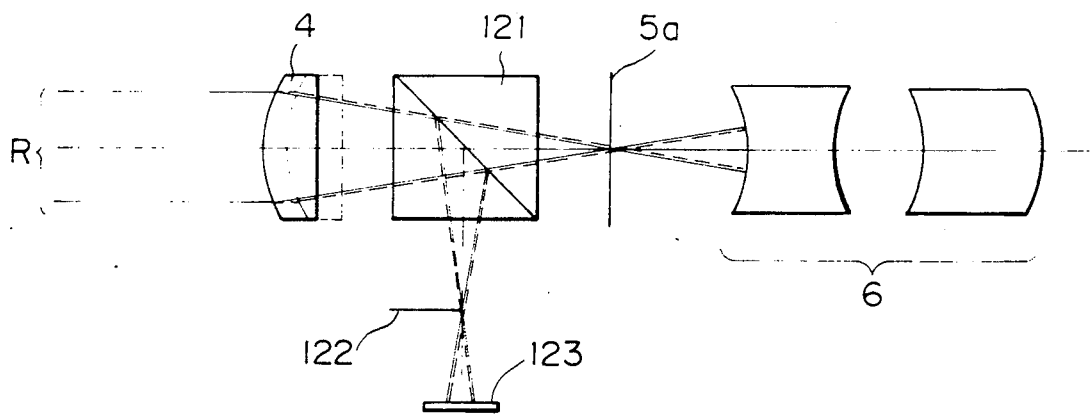
FIG. 23 is a schematic structural view which illustrates an essential portion of the scanning optical system according to an embodiment of the scanning optical apparatus provided with means for detecting a state where the light beam is made to form an image by a first image forming optical system according to the present invention.

FIG. 23 illustrates an essential portion of the construction of this embodiment of the scanning optical system. Referring to FIG. 23, there are shown the cylindrical lens 4, the fθ lens system 6, and the deflective reflection surface 5a of the rotary polygon mirror. The overall construction of the scanning optical system is substantially the same as that shown in FIG. 1.

According to this embodiment shown in FIG. 23, a beam splitter 121 is disposed between the lens 4 and the linear image forming position formed by the lens 4. Furthermore, a light receiving element 123 is provided which is capable of detecting the state of forming an image of the one light beam of the two light beam divided by the beam splitter 121, which one light beam does not propagate toward the fθ lens system 6. According to the embodiment shown in FIG. 23, a two divided light receiving element is employed as the light receiving element 123. A light shielding plate 122 is disposed between the beam splitter 121 and the light receiving element 123.

Referring to FIG. 23, a light beam R emitted from the light source is made enter the lens 4, and then is made to form an image at a position adjacent to the rotary polygon mirror. Since the beam splitter 121 is disposed between the linear image forming position and the lens 4, a portion of the light beam is splitted by the beam splitter 121, and thereafter enter the light receiving element 123 serving as the image forming position detection means.

Figure 24A:
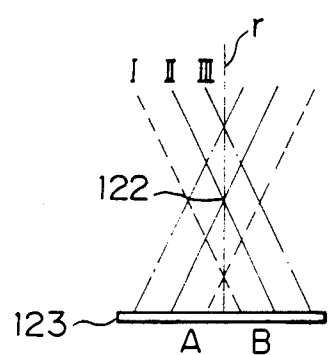
FIGS. 24A, 24B, and 25 illustrate an example of a method of detecting the movement of a position at which the first image forming optical system forms a linear image.

When the linear image forming position is moved by the movement of the lens 4 or the change of the focal length of the lens 4, the image forming position of the light beam made to enter the light receiving element also is moved as designated by I, II, and III as shown in FIG. 24A. The light shielding plate 122 is inserted between the beam splitter 121 and the light receiving element 123 so as to reach the central portion of the light beam which is made to enter the light receiving element. As a result, a portion of the light beam is screened by the light shielding plate 122. Therefore, in the case where the image forming position of the light beam made to enter the light receiving element 123 varies as shown by I, II and III in FIG. 24A depending upon the fact whether the image forming position exists on the fθ lens side or the light source side with respect to the rotary polygon mirror, the position at which the light beam enters the light receiving element 123 is shifted.

Figure 24B:
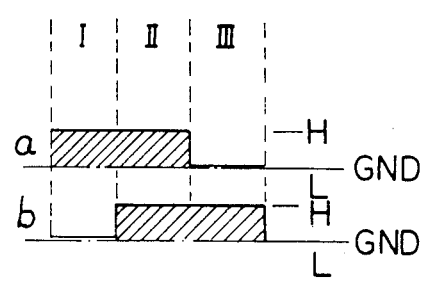

The light receiving element 123 has two light receiving surfaces A and B divided so as to run parallel to the linear image formed by the cylindrical lens 4. Both the outputs a and b from the corresponding light receiving surfaces becomes, as shown in FIG. 24B, high level H in the state II which is shown at the central portion of FIG. 24B. In the state of I, the output a becomes the high level H. In the state of III, the output b becomes the high level H. Therefore, the linear image forming position can be detected by detecting the output signal from each of the divided light receiving surfaces A and B of the light receiving element 123.

Figure 25:
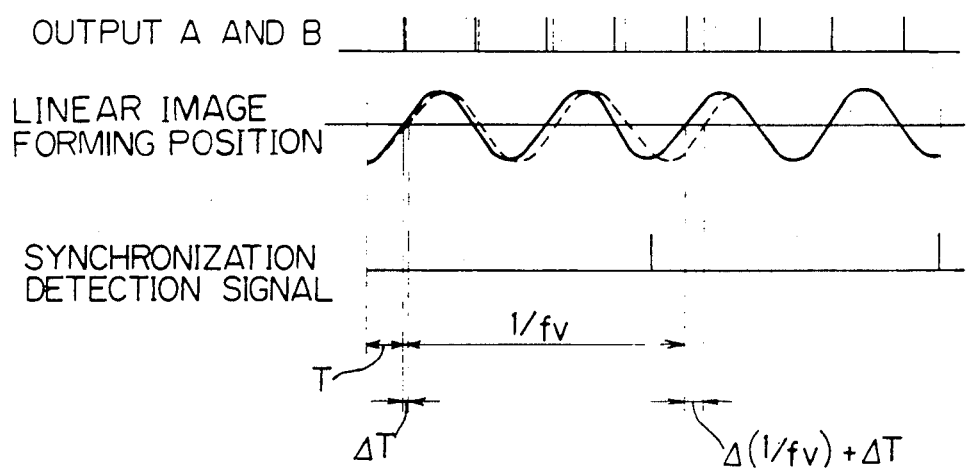

As shown in FIG. 25, detecting output signals a, b when both outputs from the light receiving surfaces A and B of the light receiving element 123 becomes the high level H, the linear image forming positions become as designated by a solid line in an ideal state of the movement of the lens 4. Furthermore, the time difference between the synchronization detection signal and the next a and b signal becomes T, and time of four signals a and b becomes 1/fv. When the correction is conducted by movement with 2 cycles per one deflective scanning operation, the linear image forming positions becomes as designated by a dashed line if the period of the movement is shifted. Also the signal a and b becomes as designated by the dashed line. As a result, T is shifted by $\Delta T$, and 1/fv is shifted by $\Delta(1/fv)$. Therefore, a real movement of the linear image forming portions approaches the ideal state designated by the solid line, for example, by feeding back an image forming position signal to the control system for the moving mechanism of the lens 4 so as to correct shifts of the period and the phase $\Delta(1/fv)+\Delta T$ to thereby control the movement of the lens 4.

Figure 26A:
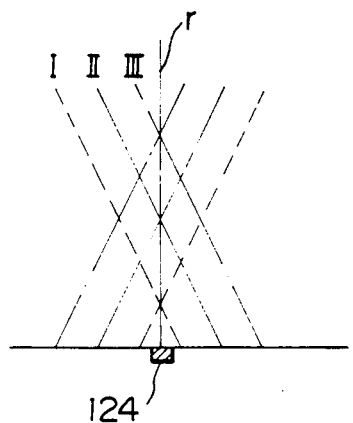
FIGS. 26A and 26B illustrate modifications of the method of detecting the movement of the position at which the first image forming optical system forms a linear image.
Figure 26B:
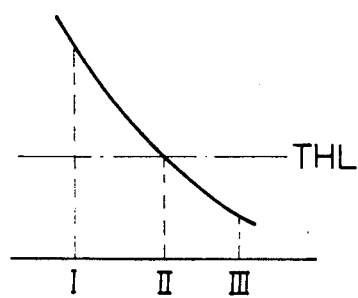

The construction shown in FIG. 25 is adapted to control only the period. An amplitude can be accurately controlled by a construction mentioned below. As shown in FIG. 26A, one light receiving element 124 is disposed on the optical axis r and the quantity of the shift of the image forming position is detected in accordance with the change in the output level shown in FIG. 26B. The movement of the lens 4 is controlled in a feedback manner on the basis of the detected signal. Symbols THL shown in FIG. 26B represents a threshold value of the output level in the case of taking as a standard a value obtained at a time when the linear image forming position formed by the lens 4 reaches the central position of the range of the movement of the linear image.

As described above, according to the scanning optical apparatus according to the embodiments shown in FIGS. 23A, 23B, 26A and 26B, since means for detecting the movement of the linear image forming optical positions formed by the first image forming optical system is provided, the thus detected signal can be used as the feedback signal. Therefore, the movement or the vibration of the linear image forming positions formed by the first image forming optical system can be controlled in a closed loop control method. As a result, the field curvature can be reliably and effectively corrected.

Then, the other embodiment of a case in which the movement or the vibration of the linear image forming positions formed by the first image forming optical system is controlled in feedback control method similarly to the embodiments shown in FIGS. 23 to 26 will be described.

According to this example, the beam splitter is disposed in the scanning optical apparatus constructed similarly to the above descriptions. The beam splitter is disposed between the first image forming optical system such as the first cylindrical lens or the like and the linear image forming positions formed by the first image forming optical system. In addition, means is provided which detects the state of forming an image of one light beam of two light beams divided by the beam splitter which one light beam does not propagate toward the second image forming optical system such as the fθ lens system. The detection means is characterized by being provided with: the two divided light receiving element having light receiving elements divided along the longitudinal direction of the linear images; and means for substantially causing the optical paths from the beam splitter to the two divided light receiving element to different in optical paths reaching each of the light receiving elements. The construction mentioned above to allow the movement of the first image forming optical system to follow the deflective scanning operation in sure synchronization with the deflective scanning by feeding back as control information the state of forming an image by the first image forming optical system detected by the detection means to the control system for the moving mechanism or the like of the first image forming optical system.

Then, the construction will be described in detail with reference to the drawings.

Figure 27:
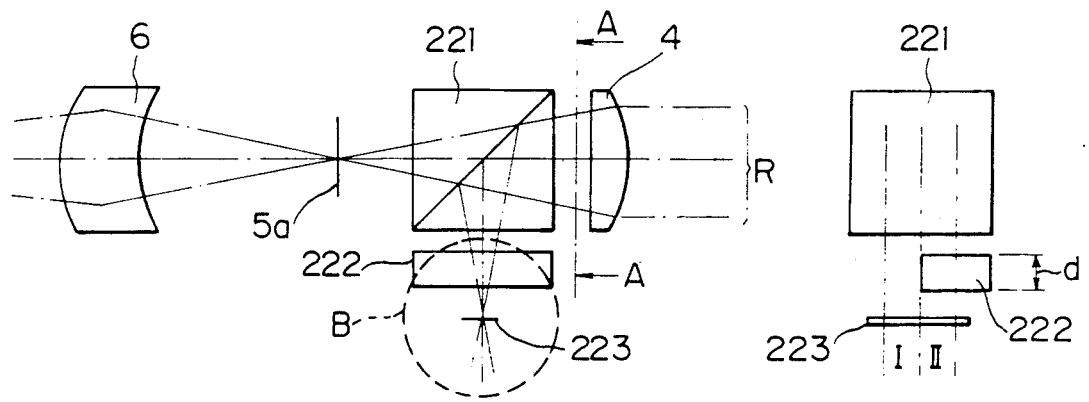
FIG. 27 is a schematic structural view which illustrates the scanning optical system of the other embodiment of the scanning optical apparatus provided with means for detecting the state of imaging of the light beam conducted by the first imaging optical system, and which shows an essential portion of the scanning optical system when viewed from the sub-scanning direction.
Figure 28:
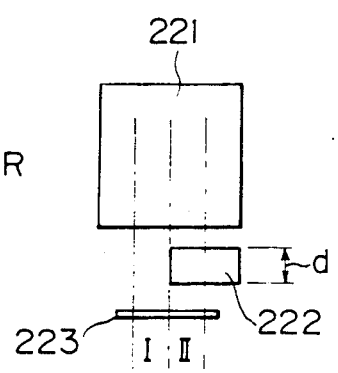
FIG. 28 is a plan view which illustrates the scanning optical system when viewed from direction A in FIG. 27.
Figure 29:
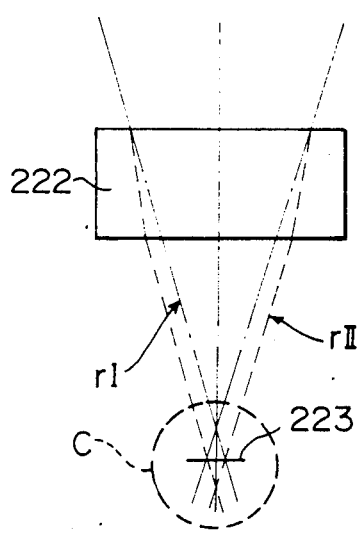
FIG. 29 is an enlarged view of the portion B shown in FIG. 27.
Figure 30:
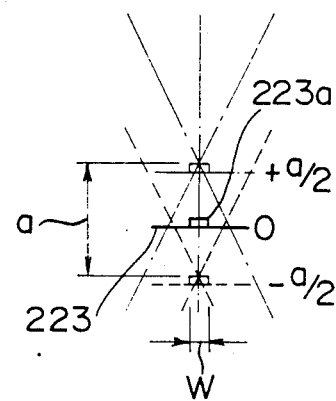
FIG. 30 is an enlarged view of the portion C shown in FIG. 29.

FIG. 27 is a cross sectional view which illustrates the essential portion of the construction of the scanning optical system according to an embodiment of the scanning optical apparatus. FIG. 28 is a view when viewed from direction A shown in FIG. 28. FIGS. 27 and 28 illustrate an arrangement from the first cylindrical lens 4 serving as the first image forming optical system of the above-described scanning optical system to the fθ lens system 6 serving as the second imaging optical system. FIG. 29 is an enlarged view of portion B shown in FIG. 27, and FIG. 30 is an enlarged view of portion C shown in FIG. 29.

Referring to FIGS. 27 to 30, collimated light beam R emitted from a laser beam source (not shown) and parallelized by a collimator optical system (omitted from illustration) is made to enter the first cylindrical lens 4 serving as the first image forming optical system. The collimated light beam is converged by the lens 4 in only the sub-scanning direction. The converged light beam is made enter the beam splitter 221 at which the incident light beam is splitted into two portions. As a result, one of the splitted light beams is deflected by the deflective reflection surface of the rotary polygon mirror, and thereafter made to form an image by the fθ lens system 6 on a medium to be scanned. The other light beam divided by the beam splitter 221 is introduced into the image forming position detection means. The state of the movement of the lens 4 is detected by the image forming position detection means. As a result, the correction of the field curvature in the sub-scanning direction can be controlled in response to the detected signal.

According to this embodiment, the detection means comprises: a two divided light receiving element 223 having the light receiving element portions 223a formed in the shape elongated in the main scanning direction and divided into two sections at substantially the central portion of the width of the light beam in the main scanning direction; and parallel flat glass 222 inserted upto the substantially central portion in the main scanning direction of the other light beam for the purpose of making the optical path from the beam splitter 221 to the two divided light receiving element 223 to be different in optical paths reaching each of the sections of the two divided light receiving element 223.

The light beam into which the parallel flat glass 222 has been inserted is made to form a linear image at a position away from a portion of the light beam into which portion the parallel flat glass 222 is not inserted, by a quantity a which is determined by wall thickness d and the refractive index n of the parallel flat glass 222, where the above-described quantity a can be represented as:

$$a = (1 - 1/n)d$$

Figure 31:
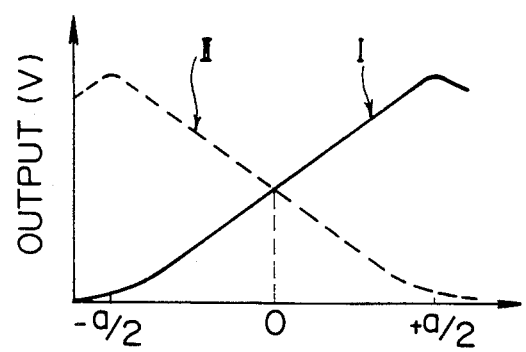
FIG. 31 is a graph which illustrates an example of output from the two divided light receiving element shown in FIGS. 27 to 30.

The light beam which does not pass through the parallel flat glass 222 is made to enter the side I of the two divided light receiving element 223, while the light beam which has passed through the parallel flat glass 222 is made enter the side II of the two divided light receiving element 223. When the two divided light receiving element 223 is disposed at the central portion of the width of a in such a manner that the outputs from the sides I and II of the two divided light receiving element 223 becomes the same, the output from the two divided light receiving element 223 becomes as shown in FIG. 31. Referring to the drawing, the solid line designates the output from the side I of the two divided light receiving element 223, while the dashed line designates the output from the side II of the same.

When the distance of the movement of the first cylindrical lens 4, that is, the distance of the movement of the image forming position of the other light beam of the divided light beams is $\pm a/2$ with respect to the image forming position of the other light beam, which image forming position corresponds to the position which is the center of the movement of the lens 4, one of the outputs from the side I or the side II becomes substantially the maximum, while the other of the outputs becomes smaller. Thus, the position of the lens 4 can be controlled by using the difference between the two outputs as a positional signal.

In order to control the movement of the lens 4, the moving mechanism constructed as shown in FIGS. 18A and 18B to 20, or a method similar to the focus control or the like for use in a usual optical disc can be used. This control can be readily conducted by controlling the movement of the first cylindrical lens 4 on the basis of the positional signal detected by the detection means.

Figure 32:
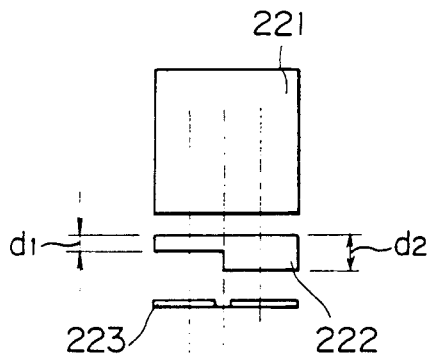
FIGS. 32 to 34 illustrate modifications of the scanning optical system shown in FIG. 27.
Figure 33:
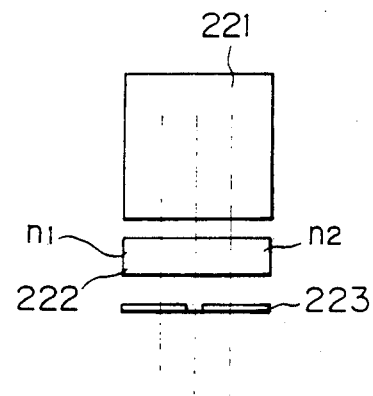

FIGS. 32 and 33 illustrate the second and third modifications of the detection means, in which the parallel flat glass 222 is inserted between the light receiving portions I and II of the two divided light receiving element 223 and the beam splitter 221 corresponding to the construction shown in FIG. 28.

In the case of the construction shown in FIG. 32, the thickness of the parallel flat glass is different between the portions corresponding respectively to the light receiving portion I and the light receiving portion II. In the case of the construction shown in FIG. 33, the refractive index is different between the above-described portions. The above-described value a can be respectively represented as:

$$a = (1 - 1/n)(d_2 - d_1)$$

$$a = (1/n_1 - 1/n_2)d$$

Since the constructions shown in FIGS. 32 and 33 are different from the construction of the detection means shown in FIG. 28, and not necessary to be provided with a space portion, the parallel flat glass 222 can be readily retained together with the beam splitter 221. As a result, the precise retaining of it can be conducted.

Figure 34:
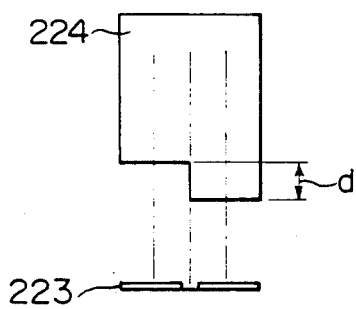

FIG. 34 illustrates the fourth modification of the detection means, where the above-described beam splitter 221 and the parallel flat glass are integrated corresponding to the modifications shown in FIGS. 28, 32, and 33.

Figure 35:
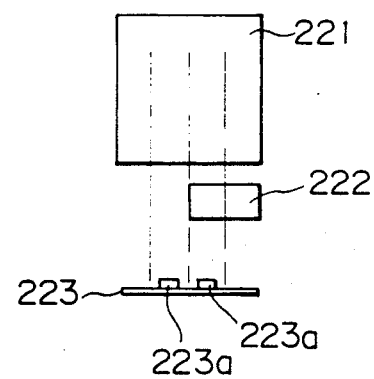
FIG. 35 illustrates the length in the longitudinal direction of a two divided light receiving element.

FIG. 35 is a view which illustrates the length in the lengthwise direction of the two divided light receiving element 223 according to this embodiment. The construction according to this embodiment corresponds to the construction shown in FIGS. 32 to 34. In the constructions shown in FIGS. 28, and 32 to 34, the light receiving portion of the two divided light receiving element projects over the light beam in part. However, according to the construction shown in FIG. 35, the light receiving portion is disposed within the light beam. Either of the construction may be employed in this embodiment.

According to the constructions shown in FIGS. 28, and 32 to 34, the position at which the light beam is divided can be moved along the longitudinal direction of the two divided light receiving element in order to equalize the outputs from the two light receiving portions with each other, and the two divided light receiving element can be moved in accordance with the above-described movement. However, in the construction shown in FIG. 35, such movement cannot be conducted. On the contrary, an advantage can be obtained in that the determination of the fitting position of the two divided light receiving element shown in FIG. 35 can be readily conducted.

The width W (in the shorter direction of the linear imaging) of the light receiving portion of the two divided light receiving element 223 shown in FIG. 30 is substantially the same as the width of the linear image. It is preferable that the width be narrower. The reason for this lies in that the excessively wide width causes the width of the light beam to be smaller than the width of the light receiving portion, causing the output from the light receiving element to become impossible to be changed. The width of the light receiving portion is for example, about 20 $\mu$m or less in the case of applying the light receiving portion to a lens system disclosed in Japanese Patent Laid-Open No. 62-172317. Since the width thus realized is sufficiently large as compared to an about 7 to 13 $\mu$m width of the light receiving portion of a usual CCD image sensor, the light receiving portion can be readily produced.

As described above, the detection means according to this embodiment comprises: the two divided light receiving element 223 having the light receiving element portions 223a formed in the shape elongated in the main scanning direction and divided into two portions at a substantially central portion of the width of the light beam in the main scanning direction; and parallel flat glass inserted up to the substantially central portion in the main scanning direction of the light beam for the purpose of making the optical paths from the beam splitter to the two divided light receiving elements to be different in optical paths reaching each of the portions of the two divided light receiving element. The detection means may be formed as one detection element in which the parallel flat glass and the two divided light receiving element are integrated via a retaining means.

Figure 36:
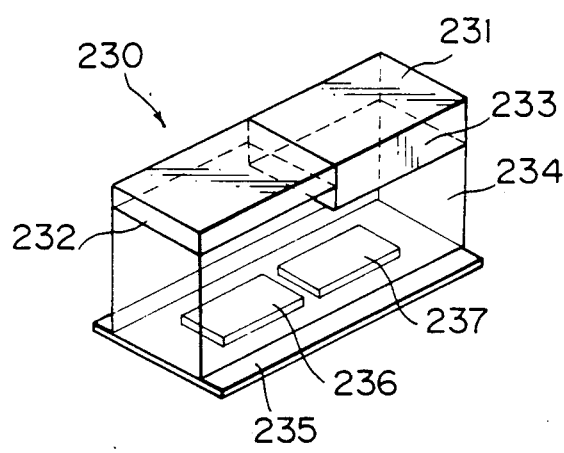
FIG. 36 is a perspective view which illustrates a detection element formed by integrating the two divided light receiving element and a parallel flat glass.
Figure 37:
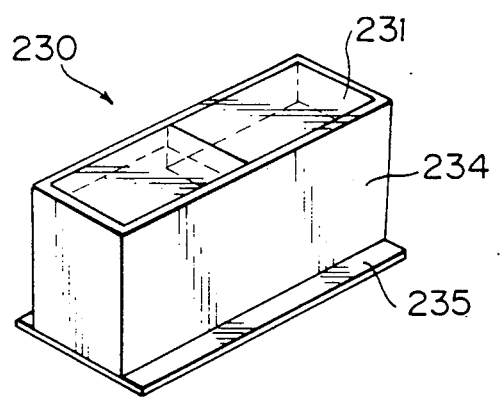
FIG. 37 is a perspective view which illustrates the appearance of the detection element shown in FIG. 36.

FIG. 36 is a perspective view which illustrates on example of the thus formed detection element. FIG. 37 is a perspective view which illustrates the appearance of the detection element shown in FIG. 36. A cover glass 231 of a detection element 230 is constituted by two parallel flat glass plates 232 and 233 each of which has a different thickness. Light receiving element portions 236 and 237 of the two divided light receiving element 235 are disposed at the positions corresponding to the parallel flat glasses 232, 233, and the two divided light receiving element 235 and the cover glass 231 are integrated by a case 234.

The outputs from each of the light receiving element portions 236 and 237 are independently outputted in the form of voltage or electric current. Referring to FIG. 36, the cover glass 231 is constituted by parallel flat plates having different thickness from each other in order to produce the optical path difference. The cover glass 231 may be constituted by parallel flat glasses having different refractive index. Combination of a parallel flat glass having a large thickness and high refractive index with a parallel flat glass having a thin thickness and a low refractive index enables the optical path difference to be enlarged.

Although the cover glass 231 is disposed away from the light receiving element 235 referring to FIG. 36, the thus formed space must not be necessarily provided. Although omitted from the illustration, the case 234 can be removed if a method is employed in which the cover glass 231 is adhered to the upper surface of the light receiving element 235.

Figure 38:
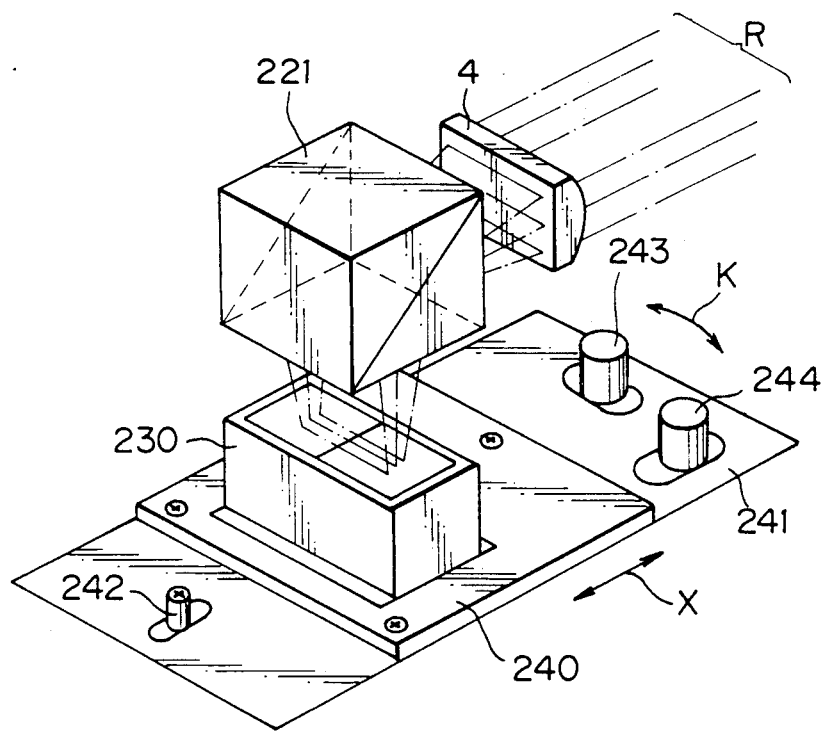
FIG. 38 is a perspective view which illustrates the structure of a state in which the detection element shown in FIG. 37 is employed.

FIG. 38 is a perspective structural view which illustrates an example to be used in the case where the detection element shown in FIGS. 36 and 37 is put into practical use. The detection element 230 is fastened to a plate 240 which is fastened to a guide plate 241.

The guide plate 241 has three elongated holes formed therein so that a reference pin 242 is fitted in one of the elongated holes and eccentric pins 243 and 244 are fitted in the two of the elongated holes. Thus, when the eccentric pin 244 is rotated, the detection element 230 is rotated in the direction K shown in the drawing. On the other hand, when the other eccentric pin 243 is rotated, the detection element 230 is moved in parallel to the direction X. Thus, the positional alignment of the detection element 230 with respect to the light beam from the beam splitter 221 can be readily conducted by adjusting the above-described two eccentric pins 243 and 244. The detection element 230 can be secured by fixing the guide plate 241 at a predetermined position after the above-described adjustment has been completed. The first cylindrical lens 4 is disposed between the beam splitter 221 and the eccentric pin 243.

As described above, since the two divided light receiving element and the parallel flat glass are integrally formed, the necessity of the positional alignment between the two divided light receiving element and the parallel flat glass can be eliminated. Furthermore, the adjustment can be readily conducted. In addition, the number of the components of the detection means can be reduced, when the cover glass for protecting the light receiving portion of the two divided light receiving element is adapted to serve as a member for producing the optical path difference.

Then, the other modification to the detection means used for controlling in feedback manner the movement or the vibration of the linear image forming position formed by the first image forming optical system similarly to the detection means shown in FIGS. 23 to 26A and 26B or the same shown in FIGS. 27 to 28 will be described.

Similarly to the above-described embodiment, the scanning optical apparatus according to this modification comprises: a beam splitter disposed between the first image forming optical system such as the first cylindrical lens or the like and the linear image forming position formed by the first image forming optical system; and means for detecting the state of forming an image of one light beam of two light beams divided by the beam splitter, which one light beam does not propagate toward the second image forming optical system such as the fθ lens system.

The detection means comprises two light receiving elements disposed along the longitudinal direction of the linear image in such a manner that respective distances from the beam splitter to each of the two light receiving element are different from each other. The state of the image formation, that is, the position of the image formed by the first image forming optical system, which state or position is detected by the above-described detection means, is fed back as control information to the control system for the moving mechanism or the like of the first image forming optical system. As a result, the movement of the first image forming optical system can assuredly follow the deflective scanning operation in synchronization with the deflective scanning operation.

Then, this embodiment will be described in detail referring to FIGS. 39 to 44.

Figure 39:
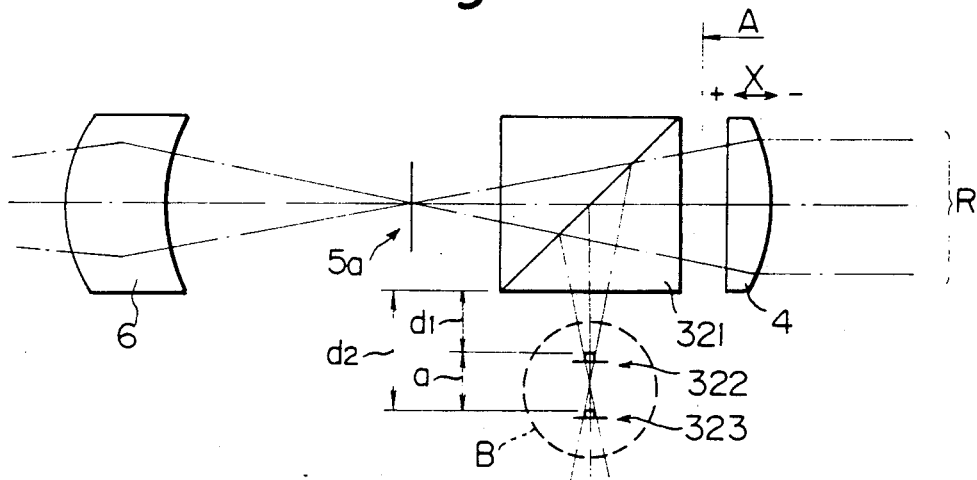
FIG. 39 is a schematic structural view which illustrates an essential portion of the scanning optical system of the other embodiment of the scanning optical apparatus provided with the means for detecting the state where the light beam is made to form an image by the first image forming optical system, and which shows an essential portion of the scanning optical system when viewed from the sub-scanning direction.
Figure 40:
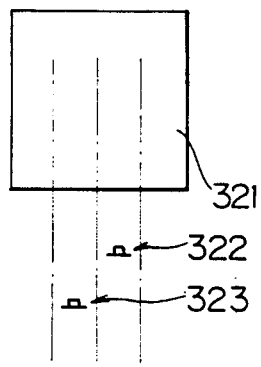
FIG. 40 is a plan view which illustrates the scanning optical system when viewed from the direction A shown in FIG. 39.

FIG. 39 is a cross sectional view which illustrates a essential portion of modification of the scanning optical apparatus according to this embodiment. FIG. 40 is a plan view when viewed from the direction A shown in FIG. 39. FIG. 40 is an enlarged view of the portion B shown in FIG. 41.

The optical system shown in FIG. 39 corresponds to the portion from the first image forming optical system to the fθ lens system in the scanning optical system described with reference to FIGS. 1 to 10. FIG. 39 illustrates the first cylindrical lens 4 serving as the first image forming optical system, the fθ lens system serving as the second image forming optical system, the deflective reflection surface 5a of the rotary polygon mirror, a beam splitter 321, a first light receiving element 322, and a second light receiving element 323.

Figure 41:
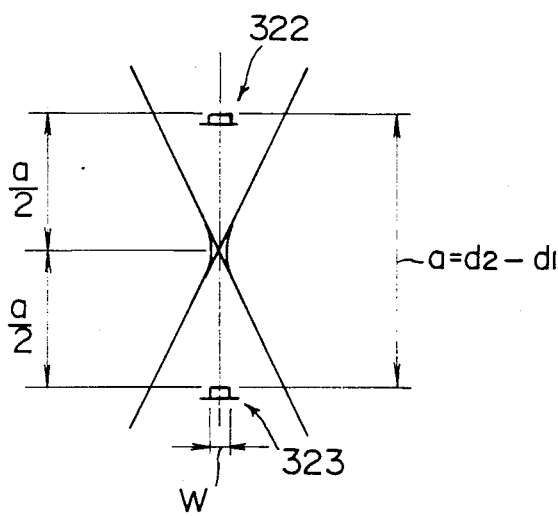
FIG. 41 is an enlarged view of portion B shown in FIG. 39.

Referring to FIGS. 39 to 41, the light beam emitted from the laser beam source (omitted from illustration) is substantially parallelized by the collimator optical system (not shown), and thereafter is made to enter the lens 4. The light beam is then converged by the lens 4 in only the sub-scanning direction. The thus converged light beam is then made to enter the beam splitter 321 so that the optical path is divided into two portions. One of the two light beams is deflected by the deflective reflection surface 5a of the rotary polygon mirror and then is made to form an image by the fθ lens system 6, on the medium to be scanned. The other light beam is introduced into the image forming position detection means by which the state of the movement of the linear image forming position formed by the lens 4 can be detected. Therefore, the control of the correction of the field curvature in the sub-scanning direction can be accurately conducted by controlling the movement of the lens 4 in accordance with information about the linear image forming position detected by the image forming position detection means.

According to this embodiment, the detection means comprises two light receiving elements 322 and 323 disposed along the longitudinal direction (in the main scanning direction) of the linear image in such a manner that the distances from the beam splitter 321 to each of the two light receiving elements are different from each other. Referring to FIG. 39, the distances from the beam splitter 321 to the two light receiving elements 322 and 323 are represented by $d_1$ and $d_2$, respectively, and difference between $d_1$ and $d_2$ is represented by a.

Figure 42:
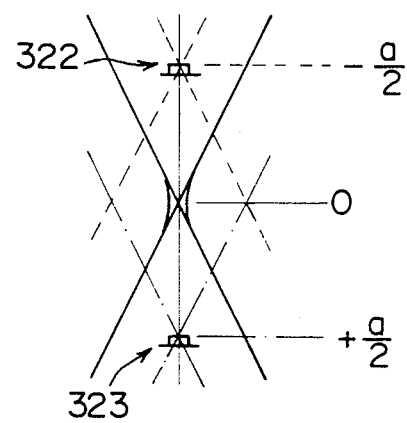
FIG. 42 is a schematic view which illustrates the relationship between a position at which the light beam is made to form an image when the first cylindrical lens is moved and positions where the two light receiving elements are arranged in the scanning optical system shown in FIGS. 39 to 41.

When the lens 4 is positioned at its reference position at which the lens 4 is the central position of the width of its movement, the two light receiving elements 322 and 323 are disposed so that the linear image forming position is placed at the intermediate position between the first and second light receiving elements 322 and 323 (so that the image forming position is placed at position away from each of the light receiving elements 322 and 323 by a/2). FIG. 42 is a schematic view which illustrates the relationship between the light beam and the two light receiving elements 322 and 323 when the first cylindrical lens 4 has been moved.

Referring to FIG. 42, when the lens 4 is positioned at the reference position, the light beam becomes as designated by solid lines in the drawing. As a result, a portion of the light beam is made enter the two light receiving elements 322 and 323, respectively. Thus, the levels of the outputs from the two light receiving elements 322 and 323 becomes substantially the same.

When the lens 4 has moved by +a/2 from the reference position, the light beam becomes as designated by a long and short dashed line. Since the converged light beam is made to enter the second light receiving element 323, causing the level of the output from the second light receiving element 323 to be raised. On the other hand, since only a portion of the light beam is made to enter the first light receiving element 322, the level of the output from the first light receiving element 322 is lowered.

On the contrary, when the lens 4 has moved by −a/2 from the reference position, the level of the output from the first light receiving element 322 is raised, while the level of the output from the second light receiving element 323 is lowered.

Figure 43:
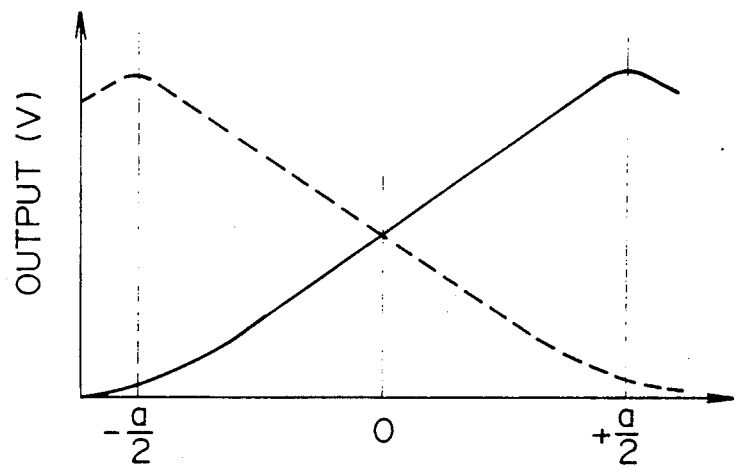
FIG. 43 is a graph which illustrates an example of the outputs from the two light receiving elements shown in FIGS. 39 to 42.

The state of change in the output from the light receiving elements in accordance with the movement of the lens 4 is shown in FIG. 43. Referring to this drawing, the solid line shown in FIG. 43 shows the change in the output from the second light receiving element 323, while the dashes line shows the change in the output from the first light receiving element 322.

Since the signal representing the difference between the output from the light receiving element 322 and the output from the light receiving element 323 can be considered to be a positional signal of the lens 4, an accurate positional control of the lens 4 can be conducted by conducting the control of the movement of the lens 4 on the basis of this signal.

The above-described moving mechanism or the like can be employed as a method of controlling the position of the lens 4.

The width W (in the shorter direction of the linear image) of the light receiving portion of the light receiving element used in the image forming position detection means is substantially the same as the width of the linear image. It is preferable that the width be narrower. The reason for this lies in that the excessively wide width W causes the width of the light beam to be smaller than the width of the light receiving portion, causing the output from the light receiving element to become impossible to be changed. The width W of the light receiving portion is, for example, about 20 μm or less in the case of applying the light receiving portion to a lens system disclosed in Japanese Patent Laid-Open No. 62-172317. Since the width thus realized is sufficiently large as compared to an about 7 to 13 μm width of the light receiving portion of a usual CCD image sensor, the light receiving portion can be readily produced.

Figure 44:
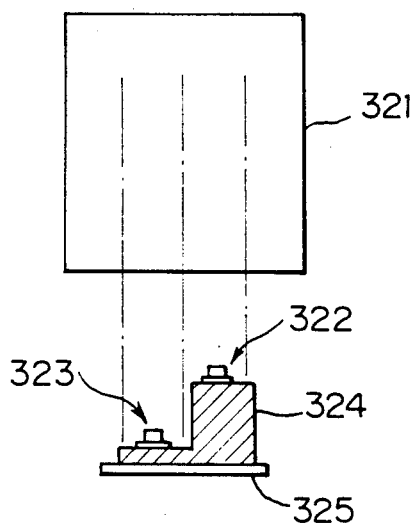
FIG. 44 is a plan view which illustrates an essential portion of a further practical example of the image forming position detection portion of the scanning optical system shown in FIG. 39.

FIG. 44 is a further practical modification of the image forming position detection portion according to this embodiment. Referring to this drawing, the modification is shown in which an insulating spacer 324 determining the height of the light receiving element is dispose on a base plate 325 and the light receiving elements 322 and 323 are disposed at the steps whose height has been determined by the spacer 324. Therefore, according to this modification shown in FIG. 44, the fastening can be readily conducted regardless of the difference in the height between the two light receiving elements 322 and 323.

The substrate 325 and the height adjusting spacer 324 can be readily integrated by resin integrating molding or the like. As a result of the structure in which the base plate 325 and the spacer 324 are integrated, the number of the components of the detection means can be reduced and the number of the portions which are necessary to be adjusted or assembled can be reduced.

What is claimed is:
1. A scanning optical apparatus comprising:
a light source for emitting a light beam;
collimator optical means for substantially parallelizing said emitted light beam;
first image forming optical means for making said parallelized light beam form a linear image;
a rotary polygon mirror having deflective reflection surfaces for deflecting and scanning said light beam forming said linear image thereon;
second image forming optical means disposed between a medium to be scanned and said deflective reflection surfaces for making said deflected light beam form an image on said medium to be scanned and for maintaining said deflective reflection surfaces and said medium to be scanned in a geometrically optical conjugate relationship in a plane perpendicular to a deflective scanning plane of said deflected light beam; and
vibration means for vibrating said first image forming optical means in a direction of an optical axis of said emitted light beam in synchronization with a deflective scanning of said rotary polygon mirror so as to vibrate in said direction an image forming position at which said parallelized light beam is made to form said linear image by said first image forming optical means.

2. A scanning optical apparatus according to claim 1, wherein said rotary polygon mirror is arranged in such a manner that said deflective reflection surfaces thereof are positioned adjacent to said image forming position realized by said first image forming optical means.

3. A scanning optical apparatus according to claim 1, wherein said first image forming optical means is provided with a cylindrical optical means having power in a plane perpendicular to said deflective scanning plane.

4. A scanning optical apparatus according to claim 1, wherein said first image forming optical means is provided with two cylindrical optical means each of which has powers in said deflective scanning plane and in a plane perpendicular to said deflective scanning plane.

5. A scanning optical apparatus according to claim 1, further comprising expander optical means having power at least in said deflective scanning plane, said expander optical means being disposed between said first image forming optical means and said deflective reflection surfaces.

6. A scanning optical apparatus according to claim 3, further comprising expander optical means having power at least in said deflective scanning plane, said expander optical means being disposed between said first image forming optical means and said deflective reflection surfaces.

7. A scanning optical apparatus according to claim 4, further comprising expander optical means having power at least in said deflective scanning plane, said expander optical means being disposed between said first image forming optical means and said deflective reflection surfaces.

8. A scanning optical apparatus according to claim 1, further comprising enlarging optical means for enlarging a quantity of displacement of said image forming position realized by said first image forming optical means upon vibrations of said first image forming optical means.

9. A scanning optical apparatus according to claim 3, further comprising enlarging optical means for enlarging a quantity of displacement of said image forming position realized by said first image forming optical means upon vibrations of said first image forming optical means.

10. A scanning optical apparatus according to claim 4, further comprising enlarging optical means for enlarging a quantity of displacement of said image forming position realized by said first image forming optical means upon vibrations of said first image forming optical means.

11. A scanning optical apparatus according to any of claims 5 to 7, wherein said rotary polygon mirror is arranged in such a manner that said deflective reflection surfaces thereof are positioned adjacent to said image forming position at which a light beam parallelized with said first image forming optical means and said expander optical means is made to form a linear image.

12. A scanning optical apparatus according to any of claims 8 to 10, wherein said rotary polygon mirror is arranged in such a manner that said deflective reflection surfaces thereof are positioned adjacent to said image forming position realized by said first image forming optical means and said enlarging optical means.

13. A scanning optical apparatus according to claims 3 or 4, wherein said cylindrical optical means includes a Fresnel lens.

14. A scanning optical apparatus according to claim 1, further comprising detection means for detecting a quantity of amplitude of said first image forming optical means, and control means for controlling said vibration means so as to vibrate said first image forming optical means with a predetermined amplitude and period in accordance with a quantity of amplitude detected by said detection means.

15. A scanning optical apparatus according to claim 14, wherein said vibration means comprises a securing member, a laminated type piezoelectric actuator attached to said securing member so as to vibrate along said optical axis of said emitted light beam, and a vibration enlarging mechanism attached at one end thereof to said piezoelectric actuator so as to enlarge the vibration of said piezoelectric actuator, said vibration enlarging mechanism being so adapted as to supply enlarged vibrations to said first image forming optical means when said one end of said vibration enlarging mechanism vibrates along said optical axis in accordance with the vibration of said piezoelectric actuator.

16. A scanning optical apparatus according to claim 15, wherein said detection means comprises an iron core secured to said scanning optical apparatus, a coil attached to said piezoelectric actuator, and detection means for detecting the quantity of amplitude of said vibration enlarging mechanism on the basis of an induced electromotive force generated in said coil when said iron core and said coil move relatively.

17. A scanning optical apparatus according to claim 15, wherein said detection means comprises a light source for emitting light in a direction intersecting a direction of the vibration of said vibration enlarging mechanism, a light shielding plate disposed on said vibration enlarging mechanism so as to stop the propagation of said light when said vibration enlarging mechanism displaces in a direction and as to allow said light to pass when said vibration enlarging mechanism displaces in a direction opposite to said direction, a light receiving element disposed on an optical path of said light so as to receive said light allowed to pass, and means for detecting the quantity of the amplitude of said vibration enlarging mechanism on the basis of a quantity of said received light.

18. A scanning optical apparatus according to claim 16 or claim 17, wherein said control means comprises a set displacement signal generating portion for outputting a set displacement signal representative of a predetermined quantity of amplitude so as to vibrate said first image forming optical means at said predetermined quantity of amplitude, a displacement determining portion electrically connected to said detection means so as to determine a present quantity of amplitude of said first image forming optical means on the basis of a quantity of amplitude of said first image forming optical means supplied from said detection means and as to output a displacement quantity signal representing said determined present quantity of amplitude, a comparison portion electrically connected to said set displacement signal generating portion and to said displacement quantity determining portion so as to compare said set displacement signal received from said set displacement signal generating portion with said displacement quantity signal received from said displacement quantity determining portion to thereby output a result of said comparison in the form of a displacement signal, and a control portion electrically connected to said comparison portion and to said vibration means so as to set voltage to be applied to said vibration means on the basis of said displacement signal received from said comparison portion and as to output a voltage setting signal representing said set voltage to said vibration means.

19. A scanning optical apparatus according to claim 14, wherein said vibration means comprises a base member disposed along said optical axis of said emitted light beam and, two laminated bimorph type piezoelectric element attached to said base member through a securing member so as to vibrate on said optical axis said first image forming optical means secured to said base member.

20. A scanning optical apparatus according to claim 14, wherein said vibration means comprises a vibrator generating vibration along said optical axis of said emitted light beam, a horn connected at one end thereof to said vibrator and extending along said optical axis so as to enlarge an amplitude of said vibration of said vibrator, and a support member supporting said first image forming optical means and attached to the other end of said horn so as to transmit a vibration enlarged by said horn to said first image forming optical means.

21. A scanning optical apparatus according to claim 1, further comprising a beam splitter disposed between said first image forming optical means and said image forming position realized by said first image forming optical means for splitting a portion of said light beam emitted from said first image forming optical means in a direction crossing said light beam, and image forming state detection means disposed on an optical path of said splitted light beam so as to detect a state of image formation of said splitted light beam.

22. A scanning optical apparatus according to claim 21, wherein said image forming state detection means comprises a light shielding member positioned at one end thereof in a image forming position of said splitted light beam, and a light receiving element disposed in such a manner as to perpendicularly intersect an optical axis of said splitted light beam on a side opposite to said beam splitter with respect to said light shielding member so as to detect said image forming position of said splitted light beam on the basis of a quantity of light passing through said one end of said light shielding member, and having two light receiving surfaces divided so as to become parallel to a linear image formed by said first image forming means.

23. A scanning optical apparatus according to claim 21, wherein said image forming state detection means comprises a light receiving element disposed on an optical axis of said splitted light beam on a side opposite to said beam splitter with respect to said image forming position of said splitted light beam so as to detect a quantity of discrepancy of said image forming position of said splitted light beam.

24. A scanning optical apparatus according to claim 21, wherein said image forming state detection means comprises a two divided light receiving element disposed at a position at which said splitted light beam forms an image when said first image forming optical means is positioned at a central position of the vibration of said first image forming optical means, and divided in the longitudinal direction of a linear image formed by said first image forming optical means, and optical path differentiating means disposed on said optical path of said splitted light beam between said beam splitter and said two divided light receiving element so as to differentiate two optical paths from said beam splitter to each of two divided light receiving portions of said two divided light receiving element from each other.

25. A scanning optical apparatus according to claim 24, wherein said optical path differentiating means is a parallel flat plate optical element inserted to the substantially central portion of a width of said splitted light beam.

26. A scanning optical apparatus according to claim 24, wherein said optical path differentiating means is a parallel flat plate optical element comprising two portions each of which has a different index of refraction.

27. A scanning optical apparatus according to claim 24, wherein said optical path differentiating means is a parallel flat plate optical element comprising two portions each of which has a different thickness.

28. A scanning optical apparatus according to claim 26 or claim 27, wherein said parallel flat plate optical element is integrally connected to said beam splitter.

29. A scanning optical apparatus according to claim 26 or claim 27, wherein said parallel flat plate optical element comprises two parallel flat plates each of which has a different thickness, which are respectively inserted to optical paths through which said splitted light beam propagates toward each of said two light receiving portions, and which are juxtaposed to each other, said two light receiving portions are so disposed as to respectively correspond to said two parallel flat plates, and said two divided light receiving element and said parallel flat plate optical element are integrated via holding means.

30. A scanning optical apparatus according to claim 21, wherein said image forming state detection means comprises two light receiving elements positioned on said optical path of said splitted light beam, symmetrically with each other on each side of a position at which said splitted light beam forms an image thereof when said first image forming optical means is present in a central position of vibration thereof.

31. A scanning optical apparatus according to claim 30, wherein said image forming state detection means comprises a substrate adapted so as to dispose said two light receiving elements on said optical path of said splitted light beam, symmetrically with each other on each side of a position at which said splitted light beam forms an image thereof.

* * * * *